(12) United States Patent
Pather et al.

(10) Patent No.: US 10,835,827 B1
(45) Date of Patent: Nov. 17, 2020

(54) INITIATING REAL-TIME GAMES IN VIDEO COMMUNICATIONS

(71) Applicant: Facebook, Inc., Menlo Park, CA (US)

(72) Inventors: Shyamalan Pather, Seattle, WA (US); Pablo Jose Barvo, Bothell, WA (US); Dwayne B. Mercredi, Kirkland, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/045,620

(22) Filed: Jul. 25, 2018

(51) Int. Cl.
| | | |
|---|---|---|
| *A63F 13/53* | (2014.01) | |
| *A63F 13/795* | (2014.01) | |
| *G06Q 50/00* | (2012.01) | |
| *H04N 7/14* | (2006.01) | |
| *G06T 19/00* | (2011.01) | |

(52) U.S. Cl.
CPC .......... *A63F 13/795* (2014.09); *A63F 13/53* (2014.09); *G06Q 50/01* (2013.01); *G06T 19/006* (2013.01); *H04N 7/144* (2013.01); *A63F 2300/303* (2013.01)

(58) Field of Classification Search
CPC ...... A63F 13/30; A63F 13/33; A63F 13/5378; A63F 13/52; A63F 13/525; A63F 13/5252
See application file for complete search history.

(56) References Cited

U.S. PATENT DOCUMENTS

| | | | | |
|---|---|---|---|---|
| 8,771,079 B1 * | 7/2014 | Sethi | .................. | G06Q 30/02 463/42 |
| 9,839,854 B2 * | 12/2017 | van Welzen | ............ | A63F 13/34 |
| 2002/0183105 A1 * | 12/2002 | Cannon | .................. | G07F 17/32 463/16 |
| 2003/0232648 A1 * | 12/2003 | Prindle | .................. | A63F 13/12 463/40 |
| 2005/0245317 A1 * | 11/2005 | Arthur | .................. | A63F 13/12 463/42 |
| 2006/0258463 A1 * | 11/2006 | Cugno | .................. | A63F 13/12 463/42 |
| 2007/0093297 A1 * | 4/2007 | Moshal | .................. | G07F 17/32 463/42 |
| 2008/0009344 A1 * | 1/2008 | Graham | ................. | G07F 17/32 463/25 |
| 2008/0170156 A1 * | 7/2008 | Kim | .................... | H04N 21/4433 348/567 |

(Continued)

FOREIGN PATENT DOCUMENTS

KR        2003071946 A   *  9/2003

*Primary Examiner* — Steven J Hylinski
(74) *Attorney, Agent, or Firm* — Baker Botts L.L.P.

(57) ABSTRACT

In one embodiment, a method includes, by a client system of a first user, receiving an input to initiate a first game within a first layer of a communication interface, wherein the communication interface comprises one or more layers containing a live video communication between the first user and a second user, wherein the first layer comprises a video communication of the second user; executing a gaming protocol associated with the first game; generating a game container in a second layer of the communication interface to contain the first game in a full-screen view of the communication interface; reducing the first layer containing the video communication of the second user to a thumbnail within the communication interface; and overlaying, by the client system, the first layer onto the second layer based on one or more parameters set by the gaming protocol.

12 Claims, 15 Drawing Sheets

(56) References Cited

U.S. PATENT DOCUMENTS

| | | | |
|---|---|---|---|
| 2009/0202114 A1* | 8/2009 | Morin | A63F 13/12 |
| | | | 382/118 |
| 2011/0107220 A1* | 5/2011 | Perlman | A63F 13/12 |
| | | | 715/720 |
| 2012/0079416 A1* | 3/2012 | Fagans | G06F 3/04842 |
| | | | 715/781 |
| 2012/0142429 A1* | 6/2012 | Muller | A63F 13/45 |
| | | | 463/42 |
| 2012/0178536 A1* | 7/2012 | Oh | H04L 12/1822 |
| | | | 463/42 |
| 2012/0302352 A1* | 11/2012 | Ajami | H04L 67/38 |
| | | | 463/42 |
| 2013/0019184 A1* | 1/2013 | Vonog | A63F 13/12 |
| | | | 715/751 |
| 2013/0123019 A1* | 5/2013 | Sullivan | A63F 13/424 |
| | | | 463/42 |
| 2014/0024450 A1* | 1/2014 | Ramachandran | A63F 13/10 |
| | | | 463/31 |
| 2014/0155171 A1* | 6/2014 | Laakkonen | A63F 13/12 |
| | | | 463/42 |
| 2015/0005052 A1* | 1/2015 | Harrington | A63F 13/795 |
| | | | 463/25 |
| 2015/0358577 A1* | 12/2015 | Zhou | H04L 51/10 |
| | | | 348/14.01 |
| 2017/0003740 A1* | 1/2017 | Verfaillie | G06F 3/013 |
| 2017/0165569 A1* | 6/2017 | van Welzen | A63F 13/34 |

* cited by examiner

INITIATING REAL-TIME GAMES IN VIDEO COMMUNICATIONS

TECHNICAL FIELD

This disclosure generally relates to databases and file management within network environments, and in particular relates to gaming within a communication environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

Online games are now played on various types of computing devices. An online game is a game that is either partially or primarily played by one or more users who communicate through the Internet or other data communication protocols. Conventional online game sessions are hosted or managed by a game server, which is typically one or more dedicated computers managed by the game publisher or other company. Users typically initiate online game sessions by directly accessing a web page of a third-part game server. Alternatively, applications or console games may communicate with a server to exchange score information, game updates, etc.

Gaming platforms (which may be a separate entity or part of a social-networking system) have become a useful way to host various online games that users can engage in playing. Users can access a gaming platform through their client systems. The gaming platform may enable a user to play a game either independently or in collaboration with one or more other users. The gaming platform has a potential to engage user(s) in online games and to enhance their game-play experience.

SUMMARY OF PARTICULAR EMBODIMENTS

In particular embodiments, a client system, such as a smartphone or tablet, may initiate a game within a video communication between two or more users. The video communication between the users may be through a messaging application of a social-networking application. The video communication between the users may be contained in one or more layers of a communication interface. The communication interface may generate layers for video communication of each user participating in the video communication. One layer may be a video communication of the first user in a thumbnail view and another layer may be a video communication of the second user. One of the users within the call may input a selection to initiate a game within a layer of the communication interface. The user may select the game from a list of games from a "Games" tab or a list of games. After the user selects a game, the client system may execute a gaming protocol associated with the selected game. The gaming protocol may include instructions for coordinating in-game actions between the users through application programming interface (API) calls to a gaming server. The gaming protocol may prompt the generation of a game container in a layer of the communication interface.

In particular embodiments, the game container may contain the selected game in a full-screen view of the communication interface. The client system of the first user may reduce the layer containing the video communication of the second user to a thumbnail within the communication interface and closes the layer containing the video communication of the first user. The client system may overlay the layer containing the thumbnail of the video communication of the second user onto the layer containing the game based on one or more parameters set by the gaming protocol.

In particular embodiments, the game container may contain the selected game in an augmented reality overlay. As an example and not by way of limitation, the selected game may be an augmented reality game. The client system of the first user may display the layer containing the augmented reality overlay onto the other layer containing the video communication of the second user. This may generate an effect of having virtual elements displayed onto features of a user within the video communication.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

illustrates an example method for initiating a real-time game within a video chat.

Figure 10:
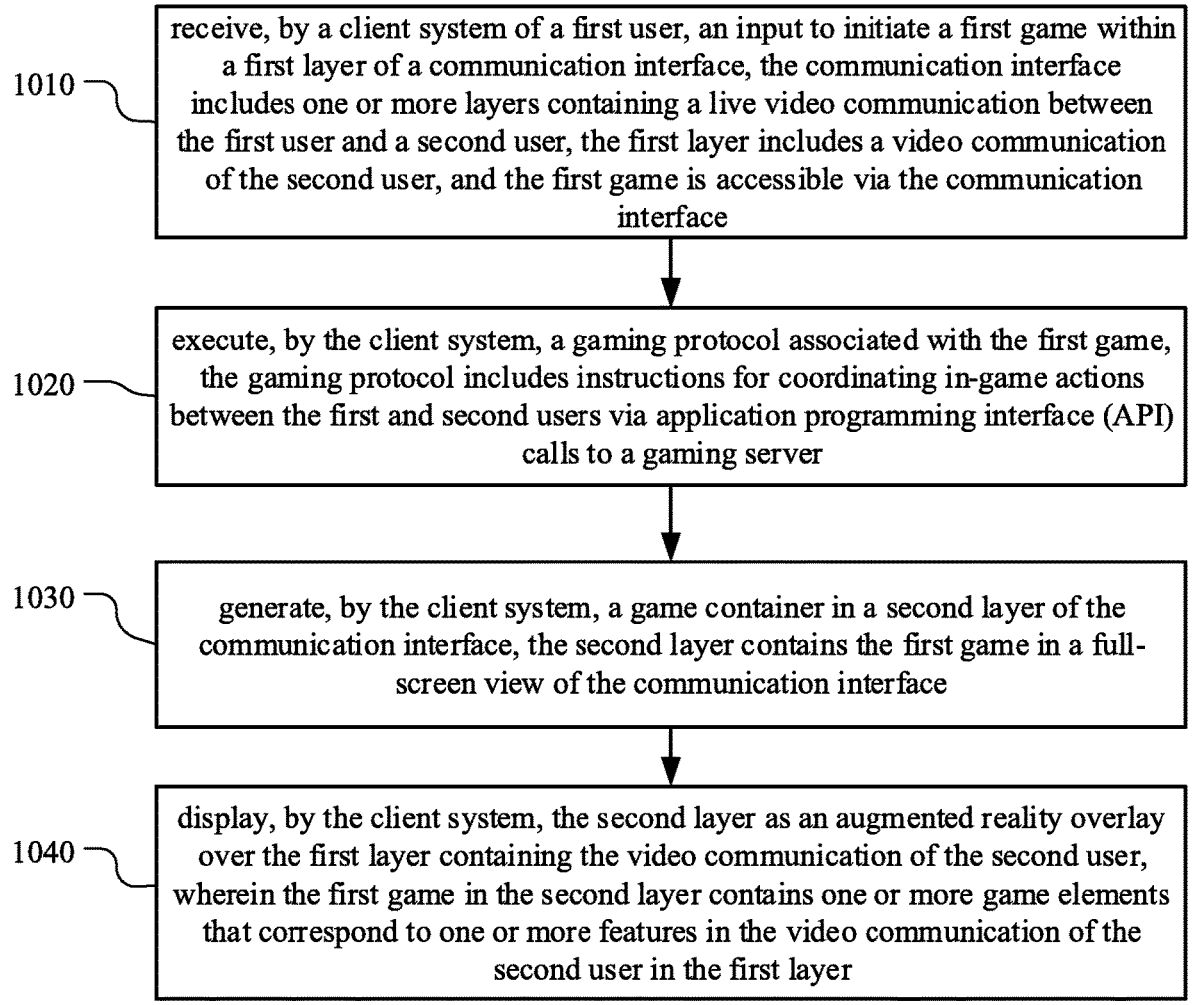

FIG. 10 illustrates an example method for utilizing an augmented reality game overlay within a video chat.

Figure 11:
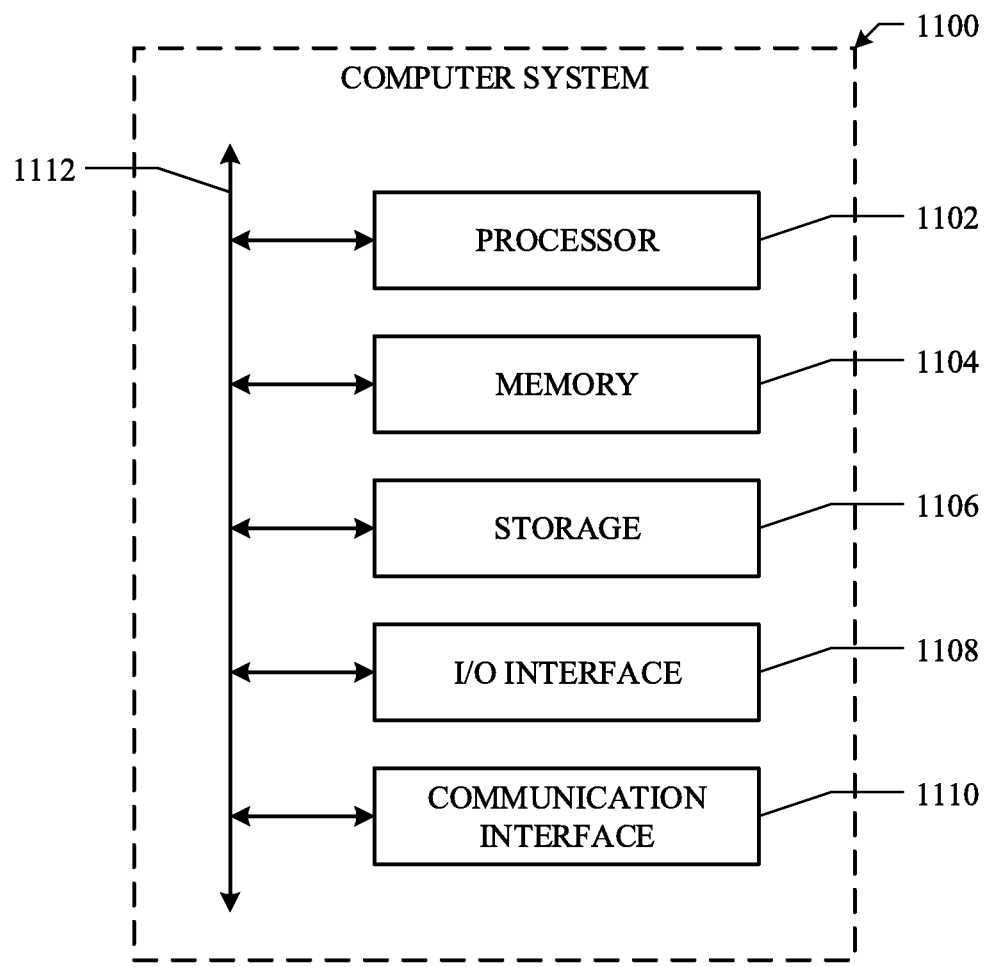

FIG. 11 illustrates an example computer system.

DESCRIPTION OF EXAMPLE EMBODIMENTS

System Overview

Figure 1:
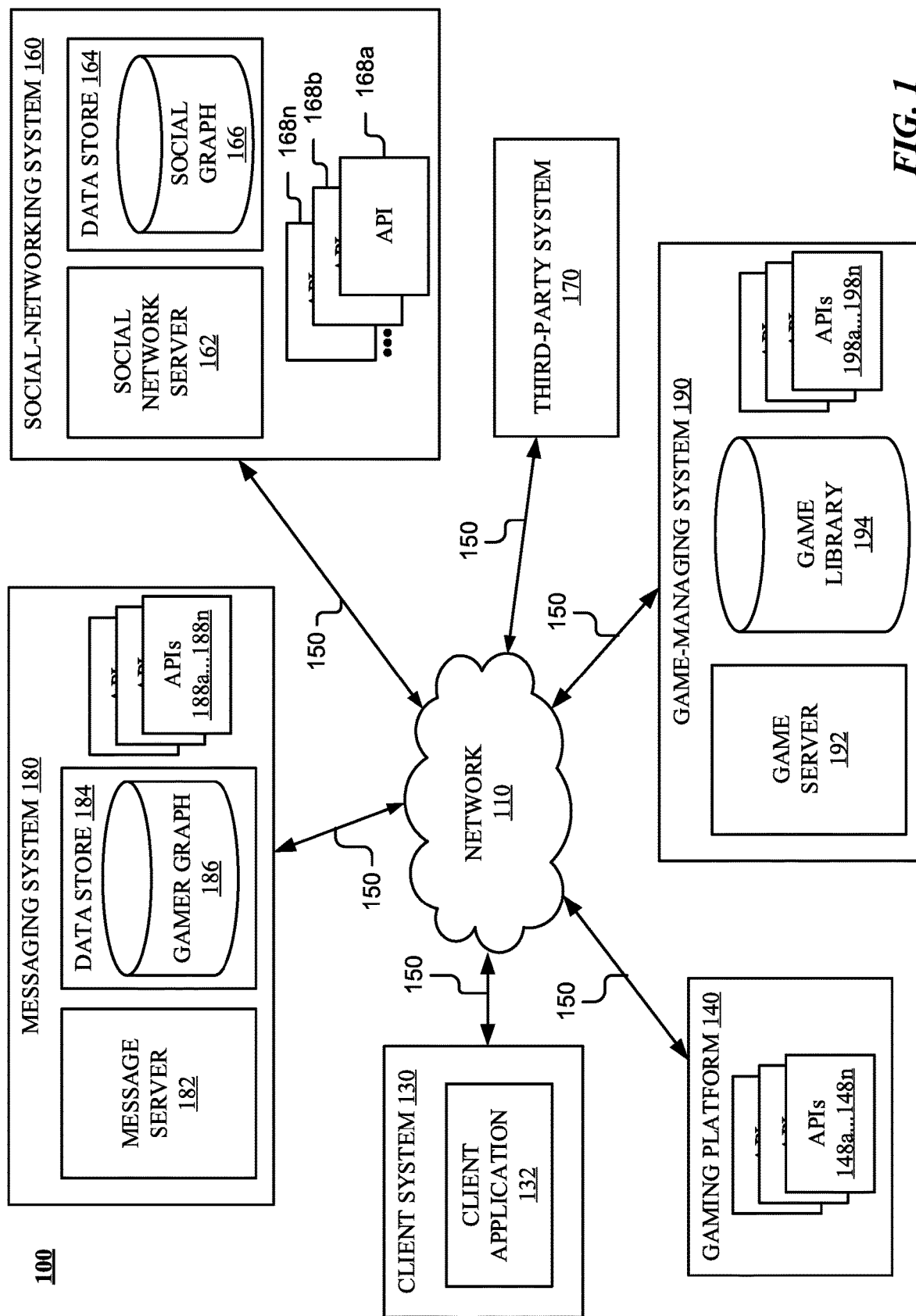
FIG. 1 illustrates an example network environment associated with a social-networking system.

FIG. 1 illustrates an example network environment 100 associated with a social-networking system. Network environment 100 includes a client system 130, a gaming platform 140, a social-networking system 160, a third-party system 170, a messaging system 180, and a game-managing system 190 connected to each other by a network 110. Although FIG. 1 illustrates a particular arrangement of a client system 130, a gaming platform 140, a social-networking system 160, a third-party system 170, a messaging system 180, a game-managing system 190, and a network 110, this disclosure contemplates any suitable arrangement of a client system 130, a gaming platform 140, a social-networking system 160, a third-party system 170, a messaging system 180, a game-managing system 190, and a network 110. As an example and not by way of limitation, two or more of a client system 130, a gaming platform 140, a social-networking system 160, a third-party system 170, a messaging system 180, and a game-managing system 190 may be connected to each other directly, bypassing a network 110. As another example, two or more of a client system 130, a gaming platform 140, a social-networking system 160, a third-party system 170, a messaging system 180, and a game-managing system 190 may be physically or logically co-located with each other in whole or in part. Moreover, although FIG. 1 illustrates a particular number of client systems 130, gaming platforms 140, social-networking systems 160, third-party systems 170, messaging systems 180, game-managing systems 190, and networks 110, this disclosure contemplates any suitable number of client systems 130, gaming platforms 140, social-networking systems 160, third-party systems 170, messaging systems 180, game-managing systems 190, and networks 110. As an example and not by way of limitation, network environment 100 may include multiple client systems 130, gaming platforms 140, social-networking systems 160, third-party systems 170, messaging systems 180, game-managing systems 190, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a gaming platform 140, a social-networking system 160, a third-party system 170, a messaging system 180, and a game-managing system 190 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a client application 132, which may be a web browser and may have one or more add-ons, plug-ins, or other extensions. A user at a client system 130 may enter a Uniform Resource Locator (URL) or other address directing a web browser to a particular server (such as social network server 162, message server 182, game server 192, or a server associated with a third-party system 170), and the web browser may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, the client application 132 may be an application operable to provide various computing functionalities, services, and/or resources, and to send data to and receive data from the other entities of the network 110, such as the gaming platform 140, social-networking system 160, the third-party system 170, the messaging system 180, and/or the game-managing system 190. For example, the client application 132 may be a social-networking application, a messaging application for messaging with users of a messaging network/system, a gaming application, an internet searching application, etc.

In particular embodiments, the client application 132 may be storable in a memory and executable by a processor of the client system 130 to render user interfaces, receive user input, send data to and receive data from one or more of the gaming platform 140, the social-networking system 160, the third-party system 170, the messaging system 180, and the game-managing system 190. The client application 132 may generate and present user interfaces to a user via a display of the client system 130. For example, the client application 132 may generate and present user interfaces, as depicted in at least FIGS. 7A-7D and 8A-8F based at least in part on information received from the gaming platform 140 or the social-networking system 160 via the network 110.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using the client application 132, which may be a web browser or a native application associated with the social-networking system 160 (e.g., a mobile social-networking application, another suitable application, or any combination thereof) either directly or via a network 110.

In particular embodiments, the social-networking system 160 may include a social network server 162. The social network server 162 may be a computing device for managing the online social network hosted on the social-networking system 160. The server 162 may be a unitary server or a distributed server spanning multiple computers or multiple datacenters. In particular embodiments, the social network server 162 may include hardware, software, or embedded logic components or a combination of two or more such components for carrying out the appropriate functionalities implemented or supported by server 162. Although a single social network server 162 is shown, it should be noted that this is not by any way limiting and this disclosure contemplates any number of social network servers 162.

In particular embodiments, the social-networking system 160 may include a data store 164. The data store 164 may be used to store various types of information. In particular embodiments, the information stored in the data store 164 may be organized according to specific data structures. In particular embodiments, the data store 164 may be a relational, columnar, correlation, or other suitable database. Although this disclosure describes or illustrates particular types of databases, this disclosure contemplates any suitable types of databases. Particular embodiments may provide interfaces that enable a client system 130, a gaming platform 140, a social-networking system 160, a third-party system 170, a messaging system 180, or a game-managing system 190 to manage, retrieve, modify, add, or delete, the information stored in the data store 164.

In particular embodiments, the social-networking system 160 may store a social graph 166 in the data store 164. In particular embodiments, a social graph 166 may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160. The social graph 166 is discussed in further detail below in reference to at least FIG. 4.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from the gaming platform 140, the third-party system 170, the messaging system 180, or the game-managing system 190, or to allow users to interact with these entities through an application programming interface (API) or other communication channels. As depicted, the social-networking system 160 may include a plurality of application programming interfaces (APIs) 168*a* through 168*n* (individually and/or collectively herein referred to as 168). An API is set of routines, protocols, and tools by which the social-networking system 160 may be able to communicate with one or more other entities of the network environment 100. In some embodiments, an API may be defined for each application associated with the social-networking system 160. For example, API 168a may be a social-networking application API, 168b may be a social-graph API, 168c may be a sharing-moments API, API 168d may be a choose-context API, API 168e may be a connected-player API, so on and so forth. In some embodiments, an API may be defined by one or more developers associated with the social-networking system 160. In some embodiments, an API of the social-networking system 160 may be sent to one or more other entities of the network environment 100 (e.g., via an API handler 202) that may enable them to add one or more additional features to the existing API of the social-networking system 160.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the gaming platform 140, the social-networking system 160, the messaging system 180, or the game-managing system 190. In particular embodiments, one or more of the gaming platform 140, the social-networking system 160, the messaging system 180, or the game-managing system 190, and the third-party system 170 may operate in conjunction with each other to provide various services/functionalities to users. For example, the social-networking system 160 and the third-party system 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof.

In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external).

A web server may be used for linking the social-networking system 160 to one or more of the client system 130, the gaming platform 140, the third-party system 170, the messaging system 180, or the game-managing system 190 via a network 110. The web server may include a mail server or other messaging functionality for receiving and routing messages between the social-networking system 160 and one or more client systems 130. An API-request server may allow a gaming platform 140, a third-party system 170, a messaging system 180, and/or a game-managing system 190 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, the messaging system 180 may be a network-addressable computing system that can host an online messaging network. The messaging system 180 may enable users to interact with each other via a messaging application that they can access through their client systems 130. The messaging system 180 may allow a user to send/receive messages, watch videos, share images, play games, etc. with other users connected to the online messaging network. The messaging system 180 may be accessed by one or more entities of the network environment 100 either directly or via the network 110. As an example and not by way of limitation, a client system 130 may access the messaging system 180 using the client application 132, which may be a native application associated with the messaging system (e.g., a messaging application), either directly or via the network 110.

In some embodiments, the messaging system 180 and the social-networking system 160 may operate in conjunction with each other to provide messaging services discussed herein to users of the messaging system 180. In this sense, the social-networking system 160 may provide a platform, or backbone, which the messaging system 180 may use to provide messaging services and functionalities to users across the online messaging network. In some embodiments, the messaging system 180 and the social-networking system 160 may be combined into one single entity and that entity may be responsible for providing the various social-networking and messaging services/functionalities to users across the Internet. For example, a single entity may include the various elements/components of the social-networking system 160 and the messaging system 180, such as a social network server 162, a message server 182, a data store (including a social graph 166 and gamer graph 186), APIs 168*a* through 168*n*, and APIs 188*a* through 1888*n*. In some embodiments, the messaging system 180 and the social-networking system 160 may be linked to each other via one or more APIs. For example, the messaging system 180 or the social-networking system 160 may call an API of the other entity to host or provide service(s) associated with the other entity in its own environment. In some embodiments, the messaging system 180 and the social-networking system 160 may operate as independent entities and may communicate with one another via the network 110 as depicted in FIG. 1. It should be noted that various other configurations by which the various entities of the network environment 100 may interact with each other are possible and is within the scope of the present disclosure.

In particular embodiments, the messaging system 180 may include a message server 182. The message server 182 may be a computing device for managing the messaging network and associated services/functionalities hosted on the messaging system 180. The message server may include hardware, software, or embedded logic components or a combination of two or more components for carrying out the appropriate functions or processes discussed herein. Although the messaging system 180 is shown here to be including a single message server 182, it should be noted that this is not by any way limiting and this disclosure contemplates any number of message servers 182.

In particular embodiments, the messaging system 180 may include a data store 184. The data store 184 may be used to store various types of information. In particular embodiments, the information stored in the data store 184 may be organized according to specific data structures. In particular embodiments, the data store 184 may be a relational, columnar, correlation, or other suitable database. Although this disclosure describes or illustrates particular types of databases, this disclosure contemplates any suitable types of databases. Particular embodiments may provide interfaces that enable a client system 130, a gaming platform 140, a social-networking system 160, a game-managing system 190 and/or a third-party system 170 to manage, retrieve, modify, add, or delete, the information stored in data store 184. Although a single data store 184 is shown as being associated with the messaging system 180, it should be noted that this is not by any way limiting and this disclosure contemplates any number of data stores 184.

In particular embodiments, the messaging system 180 may store a gamer graph 186 in the data store 184. In particular embodiments, the gamer graph 186 may include multiple nodes—which may include multiple gamer nodes or multiple game nodes—and multiple edges connecting the nodes. The gamer graph 186 may be used to determine a "game affinity" for a first user with respect to a second user based on the degree-of-separation within the graph, as well as other interactions, such as user frequency of interaction with a game, with other users, etc. The "game affinity" and these other interactions may be used to suggest one or more games to a user and/or suggest one or more other users/players for game challenges or invites. The gamer graph 186 is discussed in further detail below in reference to at least FIG. 5.

In particular embodiments, the messaging system 180 may include a plurality of application programming interfaces (APIs) 188*a* through 188*n* (individually and/or collectively herein referred to as 188). An API 188 may enable the messaging system 180 to communicate with one or more other entities of the network environment 100. For example, using API(s) 188, the messaging system 180 may be able to send data to and/or receive data from the gaming platform 140, the social-networking system 160, the game-managing system 190, or the third-party system 170. In some embodiments, an API may be defined for each application associated with the messaging system 180. For example, API 188*a* may be a messaging application API, 188*b* may be a gamer graph API, etc. In some embodiments, an API may be defined by one or more developers associated with the messaging system 180. In some embodiments, an API of the messaging system 180 may be sent to one or more other entities of the network environment 100 that may enable them to add one or more additional features to an existing API of the messaging system 180. As an example and not by way of limitation, a messaging application API of the messaging system 180 may be provided to a game developer associated with the game-managing system 190 to add one or more game relating features to the messaging application.

In particular embodiments, the game-managing system 190 may be a network-addressable computing system that can host an online gaming network. For instance, the game-managing system 190 may enable users across the Internet to play a variety of games with each other or individually. The game-managing system 190 may be accessed by one or more entities of the network environment 100 either directly or via the network 110. As an example and not by way of limitation, the messaging system 180 may access the game-managing system 190 by way of one or more APIs (e.g., API calls). API calls may be handled by an API hander, such as an API handler 202 shown in FIG. 2.

In particular embodiments, the game-managing system 190 may include a game server 192. The game server 192 may be a computing device for managing the online gaming network hosted on and associated services/functionalities provided by the messaging system 190. The game server 192 may include hardware, software, or embedded logic components or a combination of two or more components for carrying out the appropriate functions or processes discussed herein. Although a single game server 192 is shown here, it should be noted that this is not by any way limiting and this disclosure contemplates any number of game servers 192.

In particular embodiments, the game-managing system 190 may include a game library 194. The game library 194 may include a plurality of online games that may be hosted on the game server 192. The game library 194 may include games categorized and/or grouped by their respective genres. For example, the game library 194 may include games grouped by action, adventure, racing, puzzle, etc. In some embodiments, the game library 194 is a data store that is accessible and/or modifiable by the game server 192. For instance, the game server 192 may be able to manage, retrieve, modify, add, or delete, the information stored in game library 194.

In particular embodiments, the game-managing system 190 may include a plurality of application programming interfaces (APIs) 198a through 198n (individually and/or collectively herein referred to as 198). An API 198 may enable the game-managing system 190 to communicate with one or more other entities of the network environment 100. For example, using API(s) 198, the game-managing system 190 may be able to send data to and/or receive data from the gaming platform 140, the social-networking system 160, the third-party system 170, or the messaging system 180. In some embodiments, an API may be defined for each application associated with the game-managing system 190. For example, API 198a may be a games API, 198b may be a leaderborad API, 198c may be a gamer-profile API, etc. In some embodiments, an API may be defined by a game developer associated with the game-managing system 190. In some embodiments, an API of the game-managing system 190 may be sent to one or more other entities of the network environment 100 that may enable them to add one or more additional features to the existing API. As an example and not by way of limitation, a games API of the game-managing system 190 may be provided to the social-networking 160 for it to integrate games as part of its online social network.

The gaming platform 140 is a platform for hosting one or more games that a user can engage in playing. For instance, the gaming platform 140 may enable users to play a variety of games with each other or individually. The gaming platform 140 may be accessed by one or more entities of the network environment 100 either directly or via the network 110. As an example and not by way of limitation, the client system 130 may access the gaming platform 140 via the network 110 or by an API call.

In particular embodiments, the gaming platform 140 may be one of a web-based gaming platform that may be located on and is part of an online social network itself accessible through a web browser, a desktop-based gaming platform that may integrate one or more social-networking features of the online social network and may be running as a dedicated or standalone application on the client system 130 of a user, or a messaging-application-based gaming platform (also interchangeably referred to sometimes as a mobile platform or a mobile-based gaming platform) that may be integrated into a messaging application of the online social network where users may be able to play games with their social contacts via the messaging application. For example, a user may play a game with another user within a message thread of the messaging application. In another example, a user may play a game with another user within a video chat of the messaging application (e.g., see FIG. 7C and FIG. 8C) (each of these platforms discussed in detail below).

In particular embodiments, the gaming platform 190 may include a plurality of application programming interfaces (APIs) 148a through 148n (individually and/or collectively herein referred to as 148). An API 148 may enable the gaming platform 140 to communicate with one or more other entities of the network environment 100. For example, using API(s) 148, the gaming platform 140 may be able to send data to and/or receive data from the client system 130, the social-networking system 160, the third-party system 170, the messaging system 180, or the game-managing system 190. In some embodiments, the gaming platform 140 and the game-managing system 190 may operate in conjunction with each other to provide gaming services discussed herein to users of the gaming platform 140. In some embodiments, the gaming platform 140 and the game-managing system 190 may be combined into one single entity and that entity may be responsible for providing the various gaming services/functionalities to users across the Internet. For example, a single entity may include the various elements/components of the gaming platform 140 and the game-managing system 190, such as a gamer server 192, a game library 194, APIs 148a through 148n, and APIs 198a through 198n. In some embodiments, the gaming platform 140 and the game-managing system 190 may be linked to each other via one or more APIs. For example, the gaming platform 140 or the game-managing system 190 may call an API of the other entity to host or provide service(s) associated with the other entity in its own environment. In some embodiments, the gaming platform 140 and the game-managing system 190 may operate as independent entities and may communicate with one another via the network 110 as depicted in FIG. 1.

In connection with network environments for online games, particular embodiments may utilize one or more systems, components, elements, functions, methods, operations, or steps disclosed in U.S. patent application Ser. No. 15/475,801, filed 31 Mar. 2017, which is incorporated by reference. More information on online games may be found in U.S. patent application Ser. No. 15/783,885, filed on 13 Oct. 2017, which is incorporated by reference. More information on gaming-context application program interfaces on online gaming platforms may be found in U.S. patent application Ser. No. 15/820,282, filed on 21 Nov. 2017, which is incorporated by reference.

Figure 2:
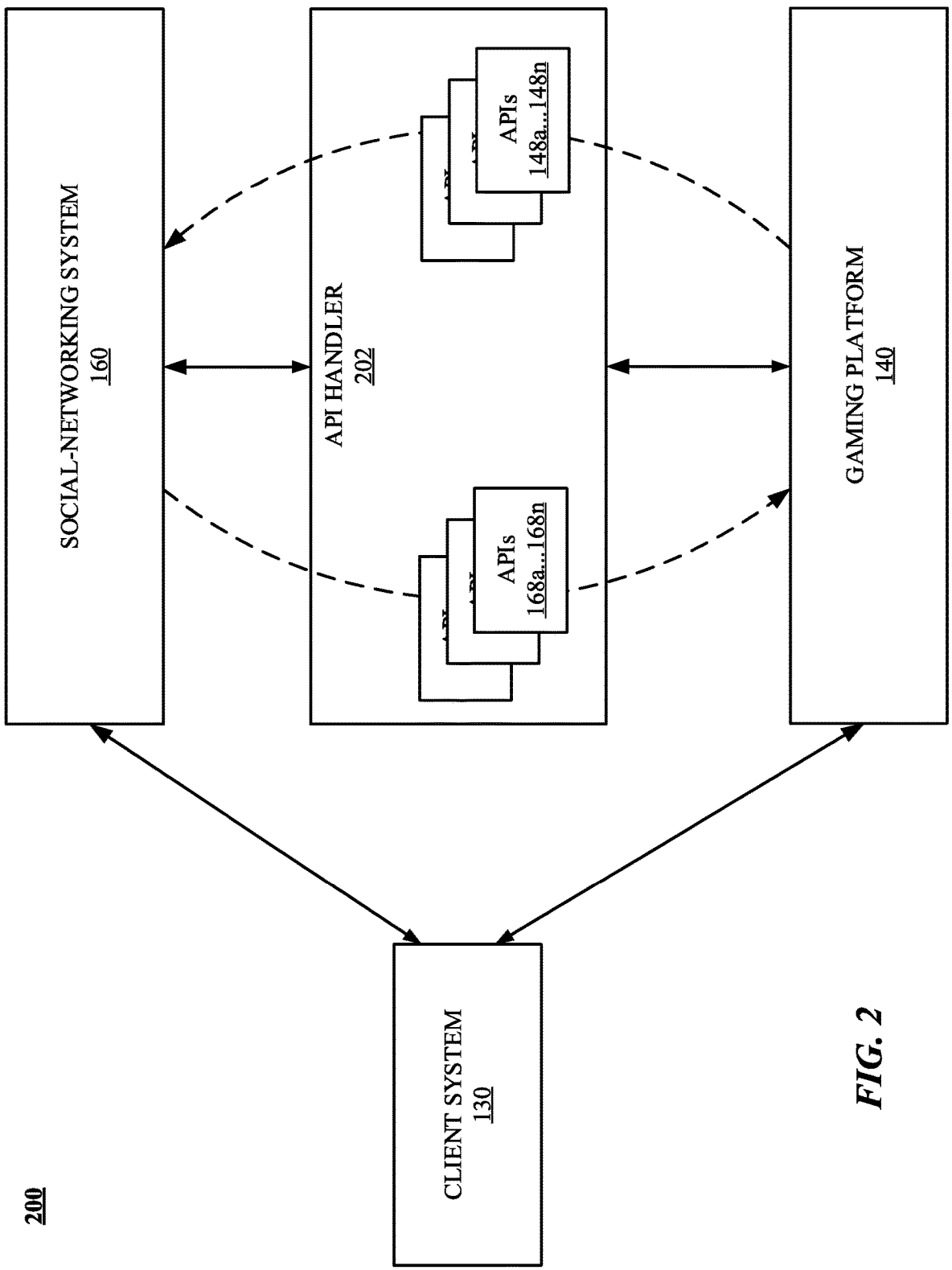
FIG. 2 is a block diagram illustrating an example environment in which a client system, a social-networking system, and a gaming platform may interact with each other.

FIG. 2 is a block diagram illustrating an example environment 200 in which a client system 130, a social-networking system 160, and a gaming platform 140 may interact with each other. The client system 130 may be connected to the social-networking system 160 and/or the gaming platform 140 via the network 110 (e.g., internet). In particular embodiments, the client system 130 may access functionalities provided by the social-networking system 160 and/or the gaming platform 140 via a client application 132. For example, the client application 132 may be a social-networking application running on the client system 130 and connected to the social network server 162 via the network 110 to enable access to one or more social-networking features (e.g., newsfeed, games, messaging, photos, videos, etc.). As another example, the client application 132 may be a gaming-platform application running on the client system 130 and connected to a gaming platform server (not shown) via the network 110 to enable access to one or more games hosted on the gaming platform 140. In some embodiments, the client system 130 may access the gaming platform 140 via the social-networking system 160, as discussed elsewhere herein.

In particular embodiments, the social-networking system 160 and the gaming platform 140 may interact with each other via APIs. For instance, the social-networking system 160 may send one or more of its APIs 168 to and/or receive one or more of the APIs 148 from the gaming platform 140. Similarly, the gaming platform 140 may send one or more of its APIs 148 to and/or receive one or more of the APIs 168 from the social-networking system 160. One example embodiment of API(s) transfer is shown and discussed in detail in reference to FIG. 3. The transfer of APIs or API calls may be handled by an API handler 202. The API handler 202 is a software, logic, and/or routine for handling API requests/calls from one entity to another. For example, the API handler 202 may receive a request from the gaming platform 140 for an API 168 of the social-networking system 160. The API handler 202 may transfer the request to the social-networking system 160 and in response receive the requested API and then send that API to the gaming platform 140 to fulfil the request. Similarly, the API handler 202 may handle a request for an API associated with the gaming platform 140 from the social-networking system 160. As another example, the API handler 202 may enable the social-networking system 160 and the gaming platform 140 to access functionalities of one another by handling API calls between the two parties.

Figure 3A:
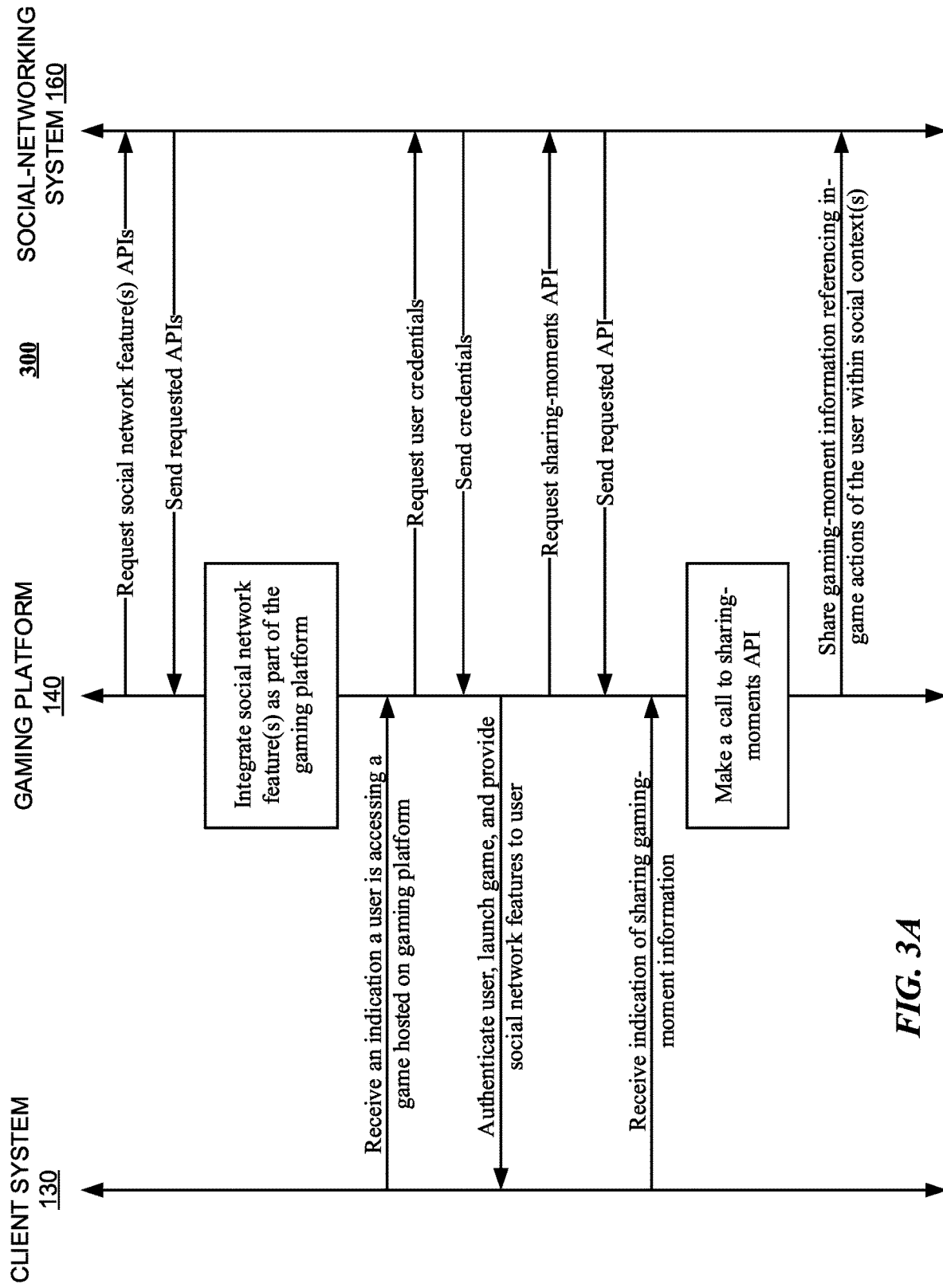
FIG. 3A is an example interaction/flow diagram illustrating example interactions between a client system, a gaming platform, and a social-networking system.

FIG. 3A is example interaction/flow diagram 300 illustrating example interactions between a client system 130, a gaming platform 140, and a social-networking system 160. In particular, the interaction/flow diagram 300 shows one exemplary way by which the gaming platform 140 requests one or more APIs from the social-networking system 160 and provide one or more services to a user of the client system 130 via the one or more APIs. It should be noted that the interaction/flow diagram 300 shown in FIG. 3A is for exemplary purposes only and is not by any way limited to these interactions. A variety of other interactions are also possible between these entities and is within the scope of the present disclosure.

As depicted in FIG. 3A, the gaming platform 140 requests one or more social network-feature APIs from the social-networking system 160. For example, the gaming platform 140 may request a newsfeed API (for integrating a live media feed where people can post media content), a messaging API (for integrating a messaging application for exchanging messages/chats between two or more users), etc. Upon receiving the request, the social-networking system 160 looks for the requested APIs from a plurality of APIs 168 stored in a data store (e.g., the data store 164) and provide the requested APIs to the gaming platform 140. The gaming platform 140 may integrate the requested APIs as part of its gaming environment such that users of the gaming platform may be able to access social-networking features in addition to playing games within the gaming platform 140. For example, by integrating social network features APIs as part of the gaming platform 140, a user of the gaming platform 140 may be able to receive various notifications associated with an online social network, access and post content to a community/newsfeed, engage in a live chat conversation with other users, access and/or send messages to specific group(s) or individual users via a messaging application, etc. A user may be able to access one or more games and one or more social-network features discussed herein via a client application 132 on their client system 130. As discussed elsewhere herein, the one or more games may be hosted by the gaming platform 140. As depicted, the gaming platform 140 may receive an indication from the client system 130 that the user is accessing a particular game. Upon receiving the indication, the gaming platform 140 may authenticate the user access to the gaming platform 140 to play the game via a single sign-on experience in cooperation with the social-networking system 160. For example, the gaming platform 140 may request user login credentials (e.g., username, password, etc.) from the social-networking system 160. The social-networking system 160, upon receiving the request, send the requested credentials with which the user is registered at the social-networking system 160 to the gaming platform 140. Using the credentials, the gaming platform 140 may authenticate the user, launch the game for the user, and in addition provide one or more social-network features that it integrated using the social-network feature(s) APIs discussed herein.

In addition to the social-network feature(s) APIs, the gaming platform 140 may request a sharing-moments API from the social-networking system 160. Similar to the social-network feature(s) APIs, the social-networking system 160 looks for the sharing-moments API from plurality of APIs 168 stored in a data store and provides its sharing-moments API to the gaming platform 140. The sharing-moments API may enable the gaming platform 140 to share or provide gaming-moment information on one or more social contexts within the online social network. The gaming-moment information may include references to one or more in-game actions of the user of the client system 130 in the particular game and metadata associated with each of the one or more in-game actions. At some point in time, the gaming platform 140 may receive an indication from the client system 130 that the user wants to share gaming-moment information on the one or more social contexts. Upon receiving the indication, the gaming platform 140, via a call to the sharing-moments API, share gaming-moment information referencing in-game actions of the user on the one or more social contexts requested by the user. For example, the gaming platform 140 may share in-game highlights, game screenshots, user achievements, user gameplays, etc. on a personal gamefeed space of the user and/or specific user groups on the online social network of the social-networking system 160.

Additionally to the social-network feature(s) APIs, the gaming platform 140 may request an augmented reality game overlay API from the social-networking system 160. The augmented reality game overlay API generates an augmented reality overlay to be applied to a video chat between two or more client systems 130. Based on a particular activity (e.g., a game) selected, the gaming platform 140 may generate an augmented reality overlay corresponding to that particular activity. For example, if a user of a client system 130 chooses to play an augmented reality basketball game, the augmented reality game overlay API may generate a basketball hoop to be overlaid on a user's face (e.g., a participant of a video chat between one or more client systems 130 as shown in FIGS. 8C-8E). A gaming protocol may be used to determine what kind of game element(s) are generated from the augmented reality game overlay API. The gaming platform 140 may send a gaming protocol associated with a game to the client system 130 to be stored on the client system 130. The gaming protocol may contain logic to apply the augmented reality game overlay.

Figure 3B:
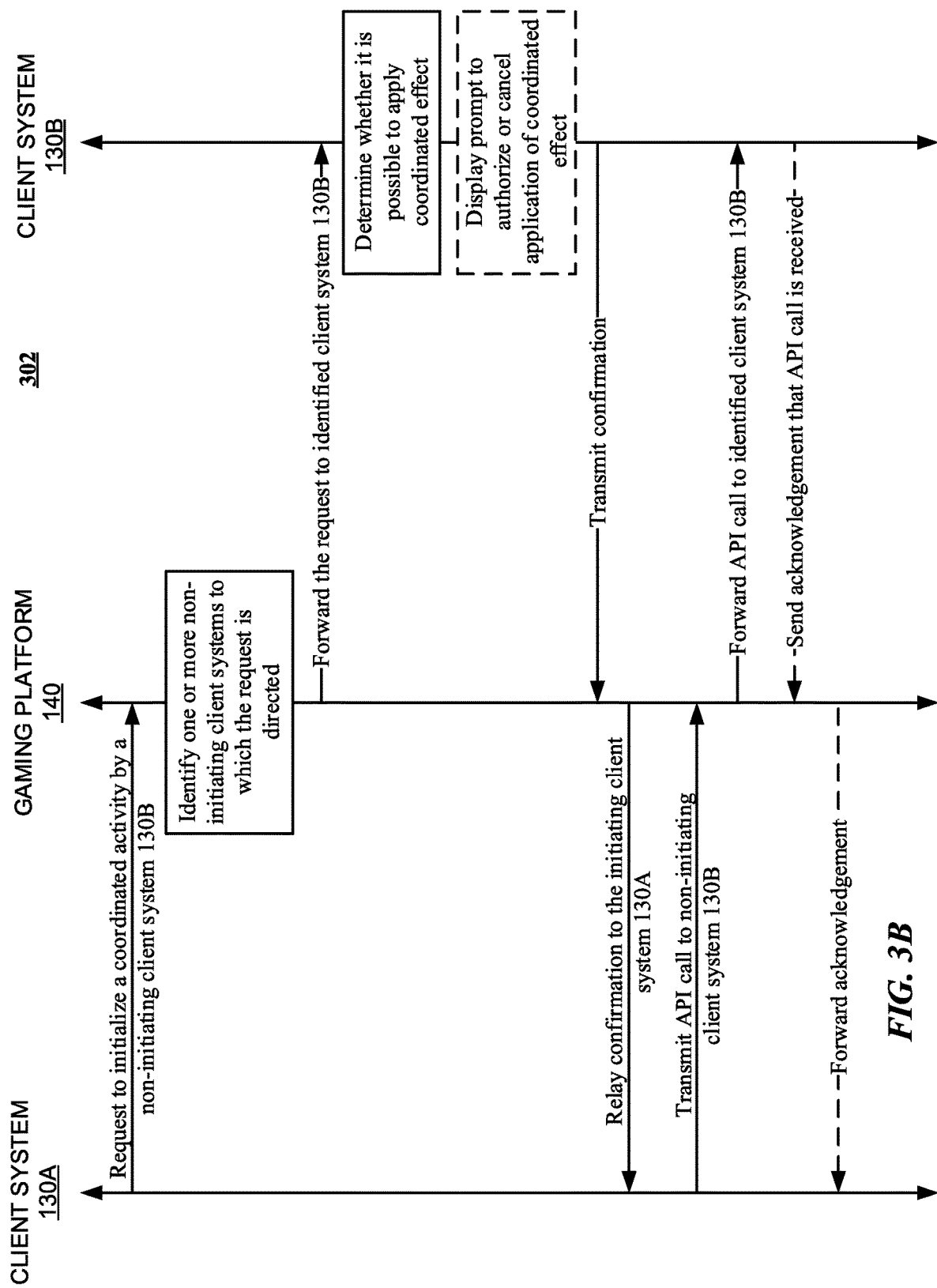
FIG. 3B is an example interaction/flow diagram illustrating example interactions between a client system, a gaming platform, and another client system.

FIG. 3B is example interaction/flow diagram 302 illustrating example interactions between a client system 130A, a gaming platform 140, and a client system 130B. In particular, the interaction/flow diagram 302 shows one exemplary way by which an initiating client system 130A may initialize a coordinated activity with a non-initiating client system 130B. It should be noted that the interaction/flow diagram 302 shown in FIG. 3B is for exemplary purposes only and is not by any way limited to these interactions. A variety of other interactions are also possible between these entities and is within the scope of the present disclosure.

As depicted in FIG. 3B, the client system 130A may send a request to initialize a coordinated activity by a non-initiating client system 130B to the gaming platform 140. For example, the user of client system 130A may select an option to initialize the coordinated activity. As an example, the coordinated activity may be an augmented reality game overlay to be applied to all client systems 130 included within a video chat. Upon receiving the request, the gaming platform 140 may identify one or more non-initiating client systems 130B to which the request is directed (e.g., based on a user identifier field in the request) and may forward the request to the identified client system 130B. Upon receiving the request from the gaming platform 140, the non-initiating client system 130B may determine whether it is possible to apply the coordinated effect (e.g., an augmented reality overlay). To determine whether it is possible to apply the coordinated effect, the non-initiating client system 130B may determine whether cached logic is up-to-date for the coordinated effect (e.g., has downloaded logic to apply the augmented reality overlay). For example, the non-initiating client system 130B may determine whether it has the gaming protocol downloaded based on an activity identifier sent with the request. If the non-initiating client system 130B determines that the coordinated effect cannot be applied, the client system 130B may be prompted to download the gaming protocol, logic, and the like to enable the application of the coordinated effect. After the non-initiating client system 130B determines the coordinated effect may be applied, the client system 130B may transmit a confirmation to the initiating client system 130A that sent the request through gaming platform 140. The client system 130B may also display a prompt to the user of the client system 130B whether to authorize or cancel the application of the coordinated effect. The user of the client system 130B may select an option to authorize or cancel the application of the coordinated effect. If the user of the client system 130B decides to authorize the application, the client system 130B may proceed to transmit a confirmation to the initiating client system 130A. If the user of the client system 130B decides to cancel the application of the coordinated effect, then the client system 130B may send a rejection to the initiating client system 130A. The gaming platform 140 relays the confirmation of the request to initialize the coordinated activity to the client system 130A. If there are more than one non-initiating client system 130B, then the gaming platform 140 may wait to receive confirmations from each other client system 130B before relaying the confirmation to the initiating client system 130A. If there is a partial confirmation, the non-initiating client system 130B who canceled the application of the coordinated effect may be removed from the communication. Alternatively, the initiating client system 130A and at least one non-initiating client system 130B who authorized the application of the coordinated effect may proceed with the coordinated activity with other client systems 130 as participants (e.g., not being able to see any coordinated activity or being able to see it if the logic is available). The gaming platform may signal the non-initiating client systems 130B when all of the parties to the coordinated effect have checked in as ready.

The non-initiating client systems 130B may instantiate, initialize, or start the coordinated effect immediately upon receiving the request from the initiating client system 130A. Alternatively, each non-initiating client system 130B may signal its willingness to start the coordinated effect, but wait to do so until all non-initiating client systems 130B have checked in as ready or opted out. The coordinated effect may be delayed by a predetermined or user-specified amount of time, may be applied upon the occurrence of a trigger condition, or may be applied when a subsequent message (such as an API call) is received.

The initiating client system 130A may transmit a series of API calls to the non-initiating client systems 130B which is received by the gaming platform and forwarded to each of the non-initiating client systems 130B. The non-initiating client systems 130B may send back an acknowledgement that the API call has been received to the initiating client system 130A through the gaming platform 140. The initiating client system 130A and non-initiating client system 130B may exchange data through the API calls via the gaming platform 140.

Social Graphs

Figure 4:
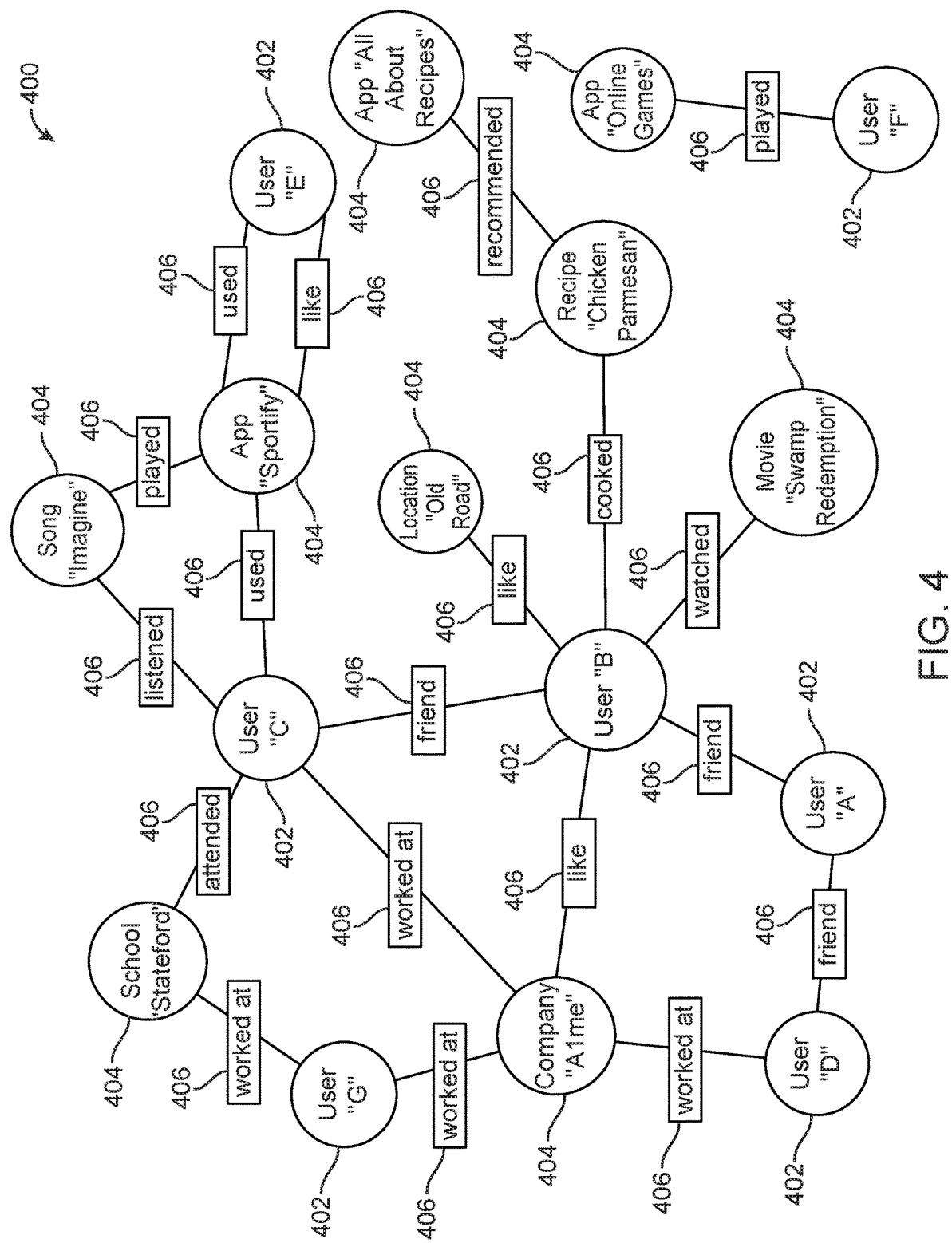
FIG. 4 illustrates an example social graph.

FIG. 4 illustrates an example social graph 166. In particular embodiments, the social-networking system 160 may store one or more social graphs 166 in one or more data stores. In particular embodiments, the social graph 166 may include multiple nodes—which may include multiple user nodes 402 or multiple concept nodes 404—and multiple edges 406 connecting the nodes. The example social graph 166 illustrated in FIG. 4 is shown, for didactic purposes, in a two-dimensional visual map representation. In particular embodiments, a gaming platform 140, a social-networking system 160, a client system 130, a third-party system 170, a messaging system 180, or a game-managing system 190 may access the social graph 166 and related social-graph information for suitable applications. The nodes and edges of the social graph 166 may be stored as data objects, for example, in a data store (such as a social-graph database). Such a data store may include one or more searchable or queryable indexes of nodes or edges of the social graph 166.

In particular embodiments, a user node 402 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with the social-networking system 160. In particular embodiments, a user node 402 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more web interfaces.

In particular embodiments, a concept node 404 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 404 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more web interfaces.

In particular embodiments, a node in the social graph 166 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 404. Profile interfaces may be viewable by all or a selected subset of other users. As an example and not by way of limitation, a user node 402 may have a corresponding user-profile interface in which the corresponding user may add content, make declarations, or otherwise express himself or herself. As another example and not by way of limitation, a concept node 404 may have a corresponding concept-profile interface in which one or more users may add content, make declarations, or express themselves, particularly in relation to the concept corresponding to concept node 404.

In particular embodiments, a concept node 404 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 402 corresponding to the user and a concept node 404 corresponding to the third-party web interface or resource and store edge 406 in one or more data stores.

In particular embodiments, a pair of nodes in the social graph 166 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 406 connecting the first user's user node 402 to the second user's user node 402 in the social graph 166 and store edge 406 as social-graph information in one or more of data stores 164. In the example of FIG. 4, the social graph 166 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 166 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to an edge type or subtype. A concept-profile interface corresponding to a concept node 404 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, the social-networking system 160 may create a "listened" edge 406 and a "used" edge (as illustrated in FIG. 4) between user nodes 402 corresponding to the user and concept nodes 404 corresponding to the song and application to indicate that the user listened to the song and used the application. Moreover, the social-networking system 160 may create a "played" edge 406 (as illustrated in FIG. 4)

between concept nodes 404 corresponding to the song and the application to indicate that the particular song was played by the particular application. In this case, "played" edge 406 corresponds to an action performed by an external application on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404).

In particular embodiments, the social-networking system 160 may create an edge 406 between a user node 402 and a concept node 404 in the social graph 166. As an example and not by way of limitation, a user viewing a concept-profile interface (such as, for example, by using a web browser or a special-purpose application hosted by the user's client system 130) may indicate that he or she likes the concept represented by the concept node 404 by clicking or selecting a "Like" icon, which may cause the user's client system 130 to send to the social-networking system 160 a message indicating the user's liking of the concept associated with the concept-profile interface. In response to the message, the social-networking system 160 may create an edge 406 between user node 402 associated with the user and concept node 404, as illustrated by "like" edge 406 between the user and concept node 404. In particular embodiments, the social-networking system 160 may store an edge 406 in one or more data stores. In particular embodiments, an edge 406 may be automatically formed by the social-networking system 160 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

Gamer Graphs

Figure 5:
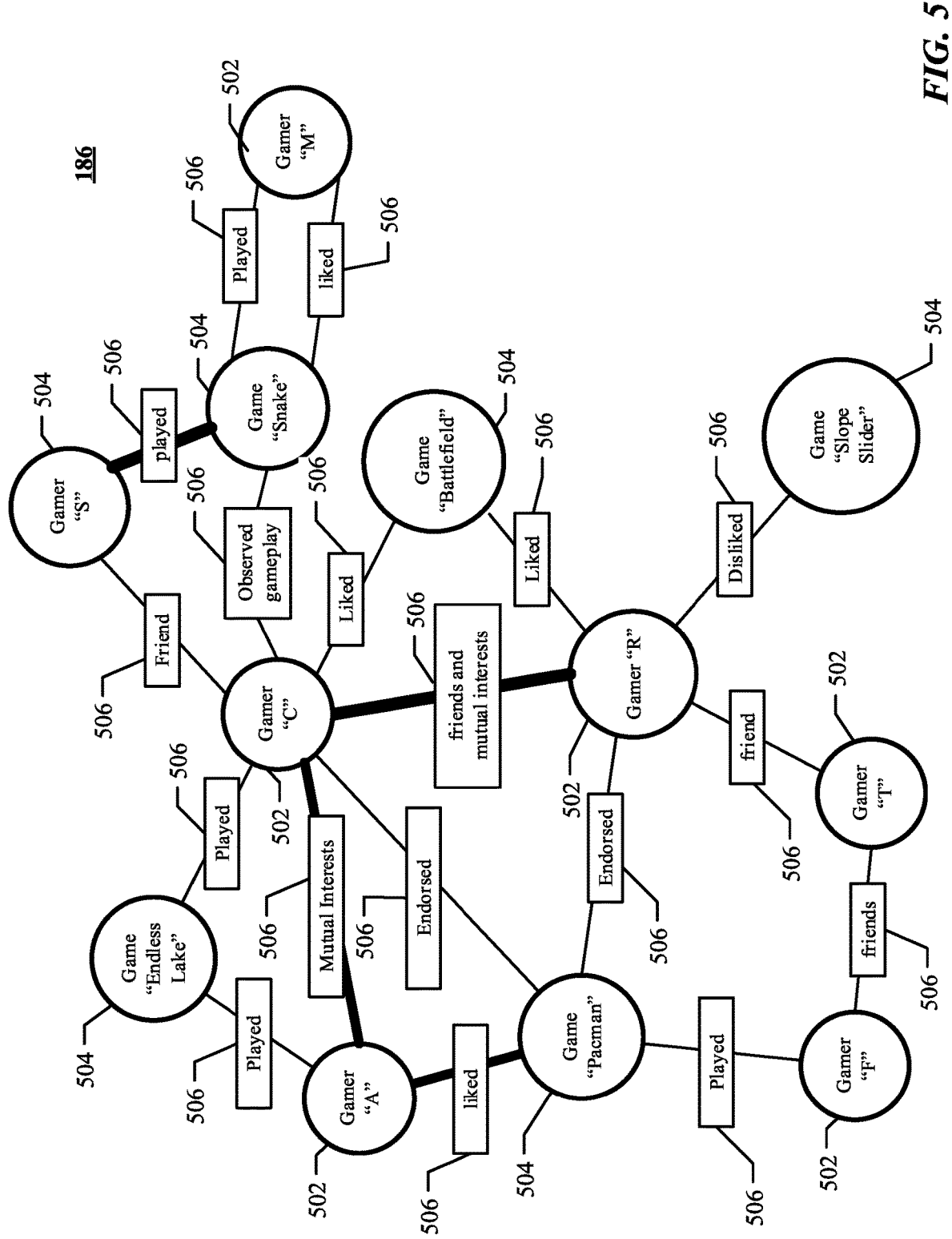
FIG. 5 illustrates an example gamer graph.

FIG. 5 illustrates an example gamer graph 186. In particular embodiments, the gamer graph 186 may include multiple nodes—which may include multiple gamer nodes 502 or multiple game nodes 504—and multiple edges 506 connecting the nodes. The gamer graph may be used to determine a "game affinity" for a first player with respect to a second player based on the degree-of-separation within the graph, as well as other interactions, such as player frequency of interaction with a game, with other players, etc. The "game affinity" and these other interactions may be used to suggest one or more games to a user and/or suggest one or more other users/players for game challenges or invites. The example gamer graph 186 illustrated in FIG. 5 is shown, for didactic purposes, in a two-dimensional visual map representation. In particular embodiments, gaming platform 140, a social-networking system 160, a client system 130, a third-party system 170, or a game-managing system 190 may access the gamer graph 186 and related information for suitable applications. The nodes and edges of the gamer graph 186 may be stored as data objects, for example, in a data store (such as a gamer-graph database). Such a data store may include one or more searchable or queryable indexes of nodes or edges of the gamer graph 186.

In particular embodiments, a gamer node 502 may correspond to a gamer of the messaging system 180. As an example and not by way of limitation, a gamer may be a user who is involved with one or more games and/or game-related activity on the gaming platform 140. In particular embodiments, when a user interacts with a game and/or perform a game-related activity (e.g., like a game, share a game with friends, challenge friends in a game, send/receive game invites, etc.) on the gaming platform 140, the gaming platform 140 may create a gamer node 502 corresponding to the user, and store the gamer node 502 in one or more data stores.

In particular embodiments, a game node 504 may correspond to a game. As an example and not by way of limitation, a game node may correspond to a "Pacman" game, "Battlefield" game, "Snake" game, "Slope Slider" game, "Batman" game, "Mario" game, "Tetris" game, "Scrabble" game, "Chess", "EverWing" game, etc. In some embodiments, the gaming platform 140 may create different game nodes 504 when one or more gamers interacts with one or more games. In some embodiments, the gaming platform 140 may create game nodes by accessing a game library from a game-managing system 190 and then creating a node for each game.

In particular embodiments, a pair of nodes in the gamer graph 186 may be connected to each other by one or more edges 506. An edge 506 connecting a pair of nodes may represent a relationship between the pair of nodes. In particular embodiments, an edge 506 between a gamer node 502 and a game node 504 may represent a particular action or activity performed by a gamer toward a game. As an example and not by way of limitation, once user "A" associated with the game node 502 played the game "Endless Cake" associated with the game node 504, the gaming platform 140 may create an edge 506 "played" (which may be referred to as a played-type edge 506) between the two nodes to indicate that "A" interacted with the game. As another example, user "R" associated with the gamer node 502 endorsed the "Pacman" game associated with the game node 504 on his newsfeed, the gaming platform 140 may create an edge 506 "Endorsed" (an endorsed-type edge 506) to indicate the gamer's activity toward that game.

In particular embodiments, different type of edges may be used to indicate a certain degree of relationship or separation between two nodes. A degree of relationship between two gamer nodes is an indicator of gamer affinity of a first gamer with respect to a second gamer. For example, the bolded edges between two gamer nodes in the gamer graph 186 may represent a strong gamer affinity between the two players. By way of example, the edge 506 between the gamer node of "C" and the gamer node of "R" indicates a very strong gamer affinity between the two gamers as they have mutual interests for the games as well as they are also friends. As another example, the edge 506 between the gamer node of "C" and the gamer node of "A" indicates a fairly strong gamer affinity between the two gamers as they also have mutual interests for the games but they may or may not be friends.

In particular embodiments, different edge types may also be used to indicate a certain degree of relationship between a gamer node and a game node. This degree of relationship between a game and a gamer may be useful to determine a player likeness/preference towards the game or frequency of interaction with that game. For example, a bolded edge between the gamer node of "S" and the game node of "Snake" may indicate that the a frequency of interaction of gamer "S" with "Snake" game is relatively higher than other games which may be an indicator of user certain degree of preference towards this game.

Gaming Moments and Groups

In particular embodiments, the social-networking system 160 may share gaming-moment information with one or more social-contexts on an online social network. The gaming-moment information may include references to one or more in-game actions of user in a game. For example, the gaming-moment information may include, as an example and not by way of limitation, in-game highlights, game screenshots, live media streams, user achievements, user gameplays, etc. The social-networking system 160 may share the gaming-moment information on one or more social contexts. The one or more social contexts may include a user's personal gamefeed space, one or more gaming groups, one or more message threads of a messaging application of the online social network, and/or a social media feed or newsfeed space on the online social network. The social-networking system 160 may receive the gaming-moment information from a gaming platform 140. The gaming platform 140 may host one or more games that the user can play. The gaming platform may be one of a web-based gaming platform that may be located on and is part of the online social network itself, a desktop-based gaming platform that may integrate one or more social-networking features of the online social network, or a messaging-application-based or a mobile-based gaming platform that may be integrated into a messaging application of the online social network. Using the mobile-based gaming platform, a user may be able to play games with one or more other users (e.g., social contacts) via the messaging application. In particular embodiments, the gaming platform may authenticate the user to play a game via a single sign on (SSO) process in cooperation with the social-networking system 160. For example, the gaming platform may receive user login credentials (e.g., username, password) from the social-networking system 160 and use that to authenticate the user and provide access to the game. In particular embodiments, the social-networking system 160 may receive the in-game moment information from the gaming platform 140 via a sharing-moments API (discussed more below). For example, upon receiving a request, the social-networking system 160 may provide the sharing-moments API to the gaming platform 140 (e.g., see FIG. 3A), which may then call this API to send gaming-moment information to the social-networking system 160. Gaming-moment information may be shared for different game types or game genres. For example, gaming-moment information may be shared for a solo/single-player game (i.e., where a user is playing a game by himself); a multi-player game (i.e., where two or more users play the game with or against each other); a competitive multi-player game (i.e., where two or more players play the game against each other), a collaborative/cooperative multi-player game (i.e., where two or more player are playing together to finish a game); a turn-based game (i.e., where one or more players take actions in turn); a real-time/live-action game (i.e., where one or more players continuous play over time); or other suitable types of games. Specific details on how the social-networking system 160 receive gaming-moment information from the gaming platform 140 and share the information on social contexts are discussed below in reference to FIG. 6.

Figure 6:
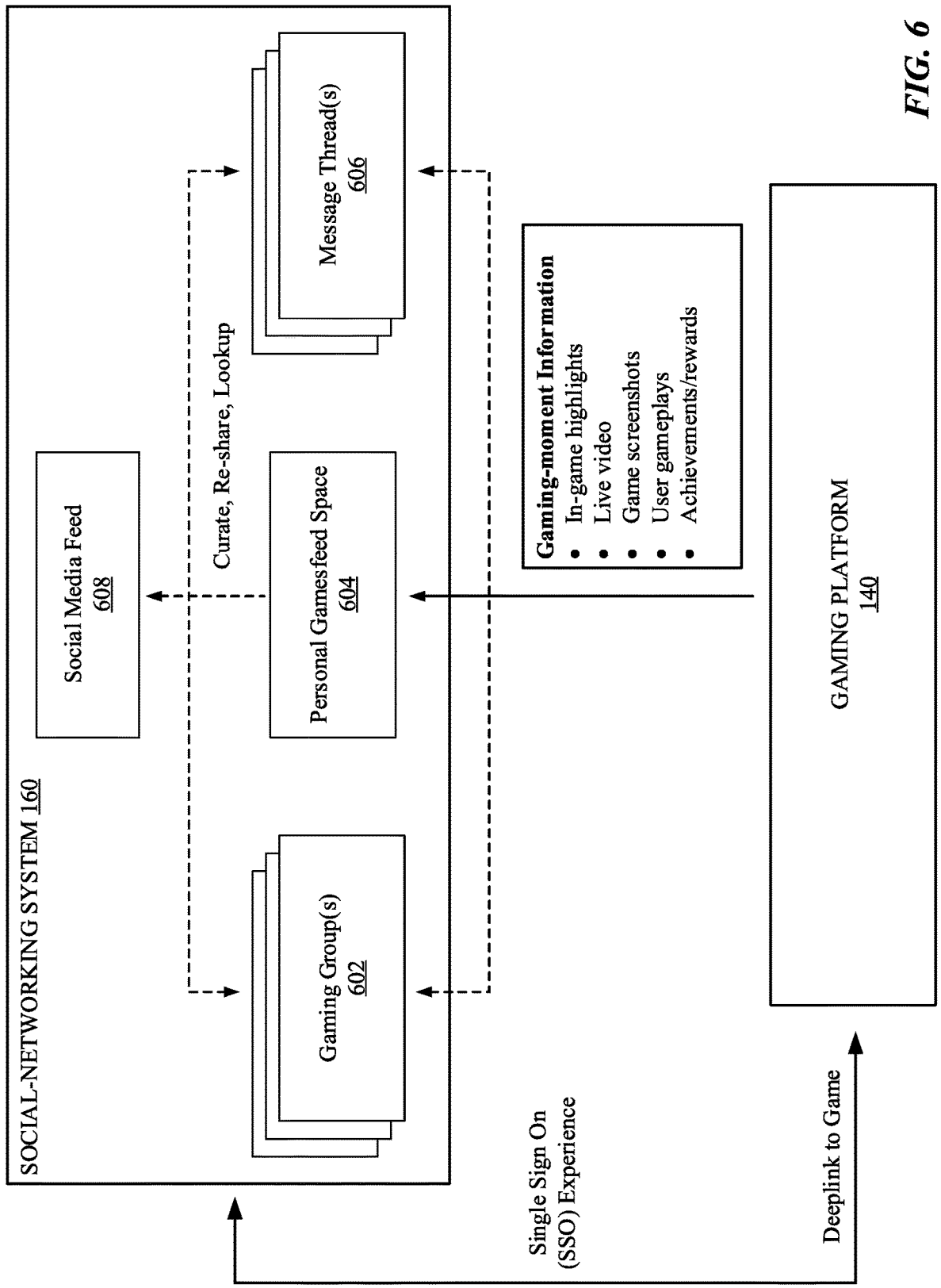
FIG. 6 is an interaction diagram showing an example interaction between a gaming platform and a social-networking system regarding sharing of gaming-moment information on social contexts within an online social network.

FIG. 6 is an interaction diagram showing an example interaction between a gaming platform 140 and a social-networking system 160 regarding sharing of gaming-moment information on social contexts within an online social network. The gaming platform 140 is a platform that may host a plurality of games that a user can play or otherwise engage with. For example, the gaming platform 140 may provide a game library containing the plurality of games to a user and the user can choose a desired game to play. There may be several ways that the user may access the gaming platform 140. As an example, the user may access the gaming platform 140 via the social-networking system 160. For instance, the gaming platform 140 may be a web-based platform that may be integrated as part of the online social network of the social-networking system 160. Links to various games may be present at some location on the online social network and the user may click on a particular game that may launch the gaming platform 140 hosting that particular game within a web browser on the client system 130 of the user.

Initiating Real-Time Games in Video Communications

In particular embodiments, the client system 130 may initiate a game within a video communication between two or more users (e.g., a participant of the video communication). The video communication may be contained within a communication interface. As an example and not by way of limitation, a participant within a video chat may hit a button to initiate a game with another participant of the video chat. A protocol may be used to negotiate how to start the game with the other participant. As an example and not by way of limitation, the protocol may request whether the other participant would like to accept the game, pick a particular game, and/or adjust any settings for the game. The protocol may include instructions for coordinating in-game actions between the two or more participants, where game elements may be generated, where to put thumbnails of a video communication, and the like. Game containers may be generated within the communication interfaces on both devices (e.g., with a video chat application on the smartphones of the two participants) to display the game and immediately match (e.g., set the two participants into the same gaming session) the two participants together. By doing so, the matchmaking experience for finding people to play a game with may be improved by reducing the time to find another participant of a game (effectively reducing the time to zero). As an example and not by way of limitation, typically a participant may choose a game to play and after initiating a game session (e.g., online chess with another participant) the participant will wait in a queue to be matched to an appropriate player, which may be filtered through many different parameters (e.g., skill level, player location, player age, and the like). The initiation of a game session within the video chat eliminates this long process of matching a participant to another player of the game. After the game containers are generated, there may be an automatic transition from a full-screen view of the video communication to a thumbnail view of the video communication, with the game container taking over the screen (e.g., full screen view) of the participant's client system 130. As an example and not by way of limitation, if a participant in a video chat initiates a chess game with the other participant in a video chat, then the layer containing the video chat may be reduced in size from a full-screen view to a thumbnail view and positioned in a corner of the communication interface, and the chess game may be maximized to fit the screen of the participant's client system 130. Games may be selected, for example, from a "Games" tab or a list of games accessible from within the video communication. Although this disclosure describes initiating an activity within a video communication in a particular manner, this disclosure contemplates initiating an activity within a video communication in any suitable manner.

In particular embodiments, the client system 130 may receive an input to initiate a game within a first layer (e.g., a video chat layer) of a communication interface. As an example and not by way of limitation, the user (e.g., participant of the video chat) of the client system 130 may click a button to initiate a game within the video chat. The communication interface may contain layers related to the live video communication between the user and another user(s) (e.g., other participants of the video chat). In particular embodiments, the user of client system 130 may click an activatable element (e.g., a button) to open a "Games" tab within the video chat to select a game to initiate. As an example and not by way of limitation, a user may click a button within the first layer of the communication interface to generate another layer containing the "Games" tab, and the user may subsequently select a game to initiate. In particular embodiments, one or more of the games may be an augmented reality game. In particular embodiments, the game may be any kind of genre implementing any kind of game mechanics. As an example and not by way of limitation, the game may be a sports game implementing a turn-based mechanic. As another example and not by way of limitation, the game may be a role-playing game. Although this disclosure describes receiving an input to initiate a game in a particular manner, this disclosure contemplates receiving an input to initiate a game in any suitable manner.

In particular embodiments, the client system 130 may execute a gaming protocol associated with the game. The client system 130 may execute a specific gaming protocol associated with the game the user selected. In particular embodiments, the client system 130 may execute a gaming protocol that includes instructions to coordinate in-game actions between the user of the client system 130 and another user of another client system 130 through API calls to the gaming platform 140. In particular embodiments, the client system 130 may send a request to a second user to execute the gaming protocol associated with the game through a gaming platform 140. In particular embodiments, the client system 130 may receive a confirmation that the second user has executed the gaming protocol associated with the game. In particular embodiments, the gaming protocol may include settings to configure the game within the communication interface. As an example and not by way of limitation, the configurable settings may include the number of rounds played, difficulty level, and other settings associated with the game. In particular embodiments, the user of the client system 130 and the other users participating in the video communication may have user profiles that include gaming-moment information and user preferences for each user. As an example and not by way of limitation, the user profile of a user may include gaming-moment information, such as number of wins, high scores, and the like for a game and user preferences, such as video quality, audio volume, and the like. In particular embodiments, the client system 130 may match the users within the video communication to play the selected game. In particular embodiments, the client system 130 may compare one or more user preferences in the user profiles of each participant of the video communication to execute the gaming protocol. As an example and not by way of limitation, if a first user prefers to have three rounds for a game and a second user prefers to have five rounds for a game, the client system 130 may settle for the user preferences of the user who selected the game, make a compromise between the two user settings, or request a user which settings to implement. Although this disclosure describes executing a gaming protocol associated with a game in a particular manner, this disclosure contemplates executing a gaming protocol associated with a game in any suitable manner.

In particular embodiments, the client system 130 may generate a game container in a second layer (e.g., a game layer) of the communication interface. The communication interface may contain the live video communication in a first layer and generate the game container in the second layer. In particular embodiments, the client system 130 may generate the game container in the second layer to contain the game in a full-screen view of the communication interface. As an example and not by way of limitation, the game may be initiated and be displayed in a full-screen view. In particular embodiments, the client system 130 may show the game in a half-screen view. In particular embodiments, the communication interface may include another layer containing a thumbnail view of a video communication of the user of the client system 130 (e.g., video of himself or herself). Although this disclosure describes generating a game container in a particular manner, this disclosure contemplates generating a game container in any suitable manner.

In particular embodiments, the client system 130 may reduce the first layer containing the video communication of the second user to a thumbnail within the communication interface. The client system 130 may change the video communication from a full-screen view to a thumbnail view. In particular embodiments, the user may adjust the position or size of the thumbnail view of the video communication of the second user. In particular embodiments, the first layer containing the video communication of the second user may be reduce to a half-screen view from a full-screen view. Although this disclosure describes reducing the first layer in a particular manner, this disclosure contemplates reducing the first layer in any suitable manner.

In particular embodiments, the client system 130 may overlay the first layer onto the second layer based on parameters set by the gaming protocol. The client system 130 may use the gaming protocol to overlay the first layer containing the live video communication of the second user in a thumbnail view over the second layer containing the game in a full-screen view. As an example and not by way of limitation, the client system 130 may place the thumbnail view in the righthand corner. In particular embodiments, the client system 130 may determine where game elements of the game are generated and overlay the thumbnail to avoid overlaying onto one or more game elements. As an example and not by way of limitation, the client system 130 may determine that the game in the second layer contains a game element, such as a map associated with the game, and overlay the thumbnail to avoid the map. In particular embodiments the client system 130 may generate the game elements of the game to avoid a default position of the thumbnail view (e.g., in the right corner of the display). In particular embodiments, the layers of the video communication may be overlaid onto the second layer containing the game. As an example and not by way of limitation, if there are multiple thumbnails associated with the video communication (e.g., one for the first user and another for the second user), the client system 130 may overlay both onto the game. In particular embodiments, if a thumbnail of the user of the client system 130 was previously displayed, then overlaying the first layer containing live video communication of the second user onto the second layer containing the game may cause the thumbnail of the user to close. Although this disclosure describes overlaying the first layer onto the second layer in a particular manner, this disclosure contemplates overlaying the first layer onto the second layer in any suitable manner.

Figure 7B:
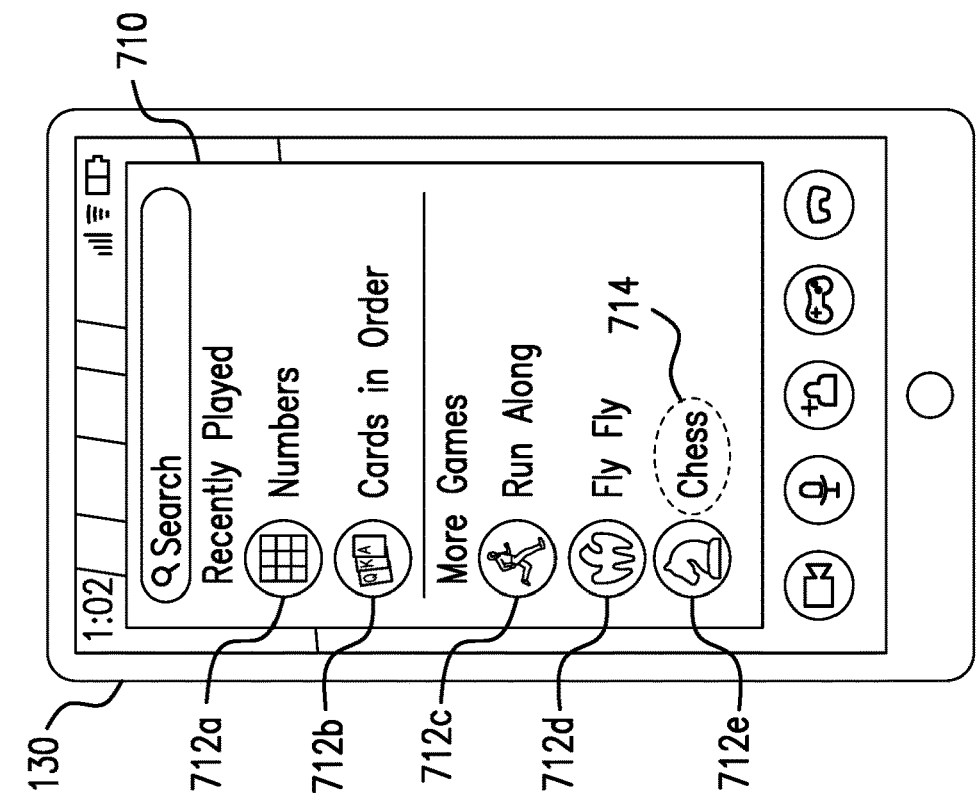
FIGS. 7A-7D are user interfaces showing an example of initiating a real-time game within a video chat.
Figure 7A:
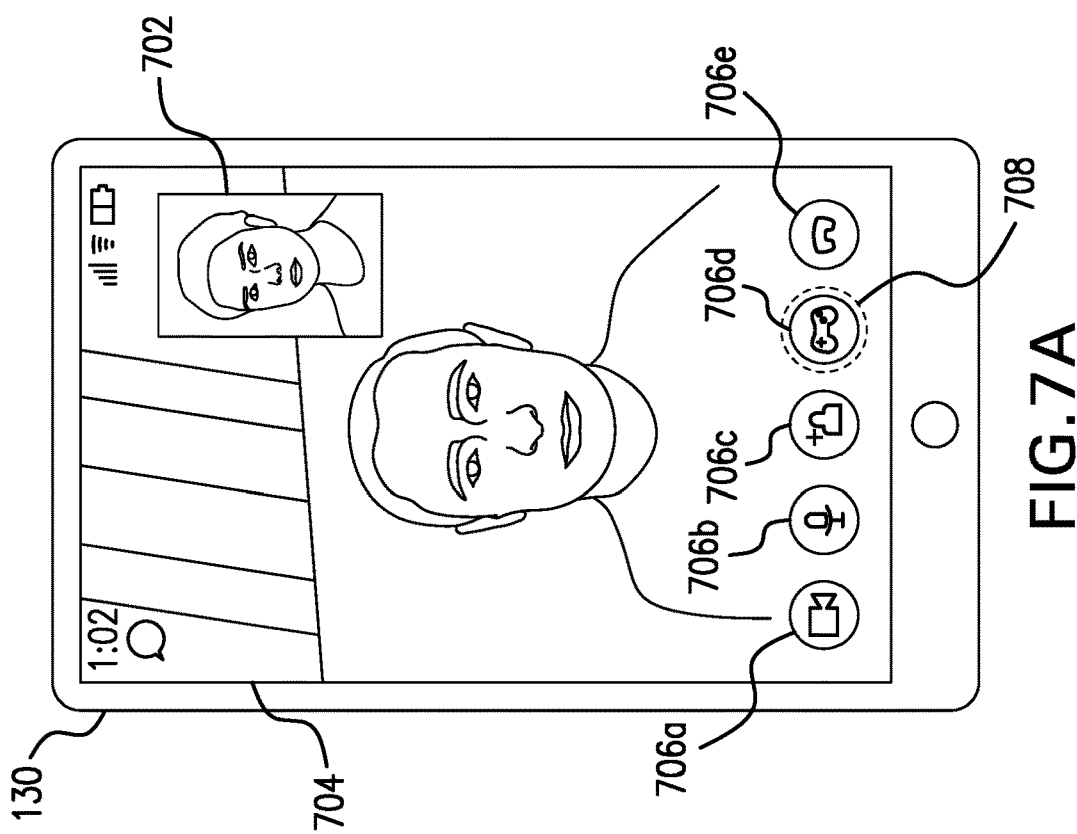

FIGS. 7A-7D illustrate an example of initiating a real-time game within a video communication between two or more users. Referring to FIG. 7A, a client system 130 may display a communication interface including multiple layers corresponding to the video communication between one or more users. The communication interface may include one layer that includes a thumbnail 702 of the user of the client system 130 and another layer 704 that includes a video communication of a second user (e.g., on his or her own client system 130). The communication interface may include a plurality of activatable elements 706a-706e that relate to different features that may be activated within the video chat. In particular embodiments, the plurality of activatable elements 706a-706e may not appear until the user taps (e.g., with his or her finger) on the user interface of client system 130. As shown in FIG. 7A, the user may select an activatable element 706d with an input 708. As an example and not by way of limitation, the activatable element 706d may be to open a "Games" tab and the input 708 may be a tap on the activatable element 706d within the communication interface.

FIG. 7B illustrates the result of the client system 130 receiving an input 708 selecting activatable element 706d within the communication interface. After the client system 130 receives the input 708 activating the activatable element 706d, the client system 130 may generate another layer 710 containing the "Games" tab, which contains a list of games 712a-712e for the user to select. As shown in FIG. 7B, the user may select a game 712e with an input 714. In particular embodiments, the layer 710 containing the "Games" tab may be scrolled through to access the plurality of games 712. The layer 710 is shown to cover the layer 702 containing the thumbnail and the layer 704 containing the video communication of the second user. In particular embodiments, the layer 710 may be generated to prevent occlusion of all of the contents of the layers 702,704. In particular embodiments, the games 712 may be downloaded onto the client system 130 through a gaming platform 140 and/or a social-networking system 160.

Figure 7D:
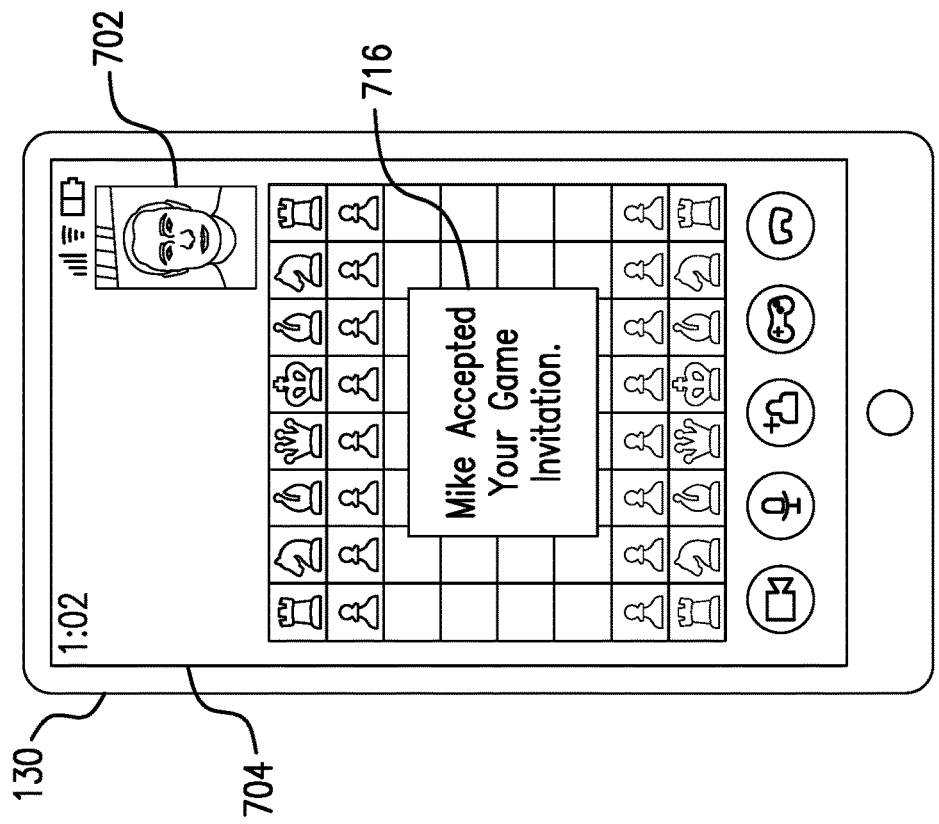
Figure 7C:
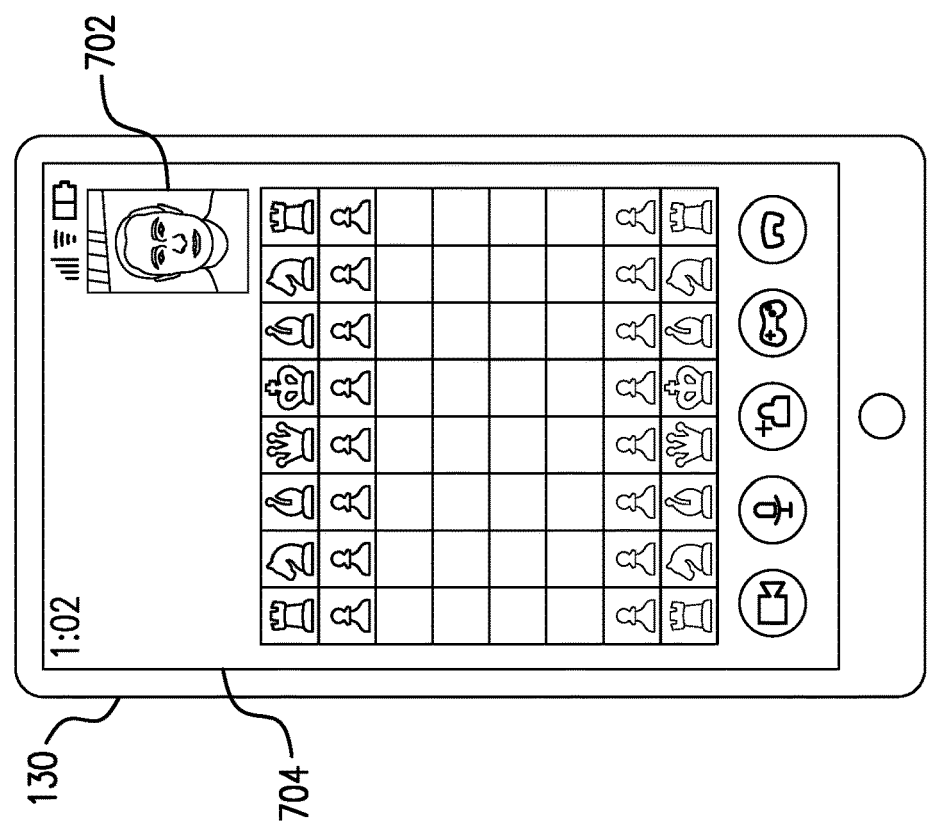

FIG. 7C illustrates the result of the client system 130 receiving the input 714 selecting the game 712e within the layer 710. After the client system 130 receives the selection of game 712e, the client system 130 generates a game container that contains the selected game that replaces the video communication in the layer 704. The client system 130 may execute a gaming protocol associated with the selected game 712e. The selected game 712e may contain instructions to operate the game. The layer 702 containing the thumbnail may be changed to include the video communication of the second user. In particular embodiments, the generation of the game container may be in a new layer to replace the previous layer 704 and the previous layer 704 may be reduced to a thumbnail view and placed in the position of the previous layer 702. Alternatively, the client system 130 may generate the game container to replace the video communication of the second user in layer 704 and replace the contents of layer 702 with the video communication of the second user. In particular embodiments, the communication interface may include the plurality of activatable elements 706a-706e.

FIG. 7D illustrates the result of receiving an acceptance 716 of a second user to participate in the selected game 712e. In particular embodiments, the user of the client system 130 may not proceed with the selected game 712e until the second user accepts to play the game. Alternatively, in particular embodiments, the user of the client system 130 may proceed with the game and later be notified with an acceptance 716. In particular embodiments, the thumbnail of layer 702 may be resized to avoid overlaying the game elements of the game contained in layer 704. In particular embodiments, the user of the client system 130 may resize or reposition the thumbnail of layer 702.

Figure 8:
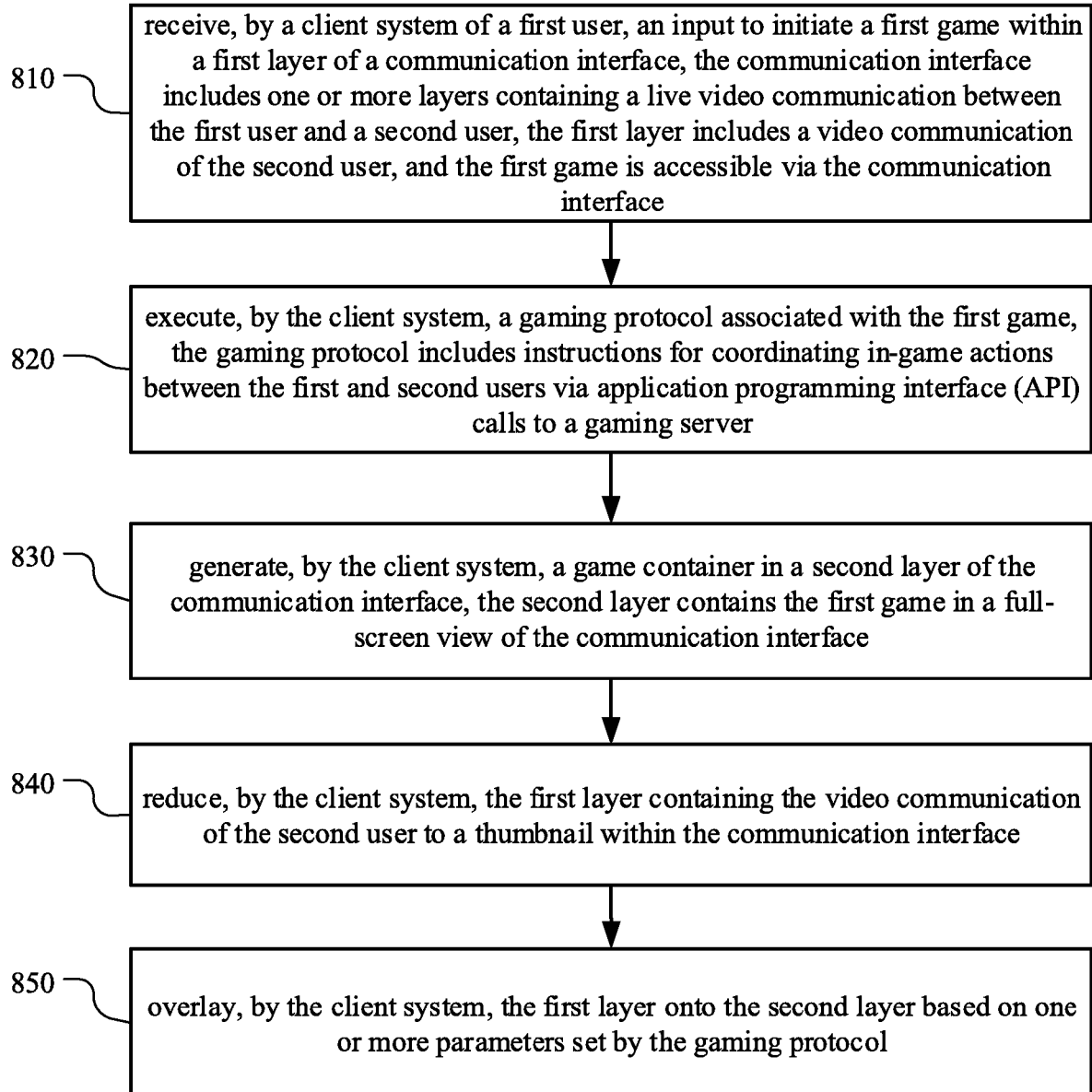
FIG. 8 illustrates an example method for initiating a real-time game within a video chat.

FIG. 8 illustrates an example method 800 for initiating a real-time game within a video communication between two or more users. The method may begin at step 810, where the client system 130 of a first user may receive an input to initiate a first game within a first layer of a communication interface that includes one or more layers containing a live video communication between the first user and a second user. The first layer may include a video communication of the second user and the first game is accessible via the communication interface. At step 820, the client system 130 may execute a gaming protocol associated with the first game. The gaming protocol includes instructions for coordinating in-game actions between the first and second users via application programming interface (API) calls to a gaming server. At step 830, the client system 130 may generate a game container in a second layer of the communication interface. The second layer may contain the first game in a full-screen view of the communication interface. At step 840, the client system 130 may reduce the first layer containing the video communication of the second user to a thumbnail within the communication interface. At step 850, the client system 130 may overlay the first layer onto the second layer based on or more parameters set by the gaming protocol. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for initiating a real-time game within a video communication between two or more users including the particular steps of the method of FIG. 8, this disclosure contemplates any suitable method for initiating a real-time game within a video communication between two or more users including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Augmented-Reality Game Overlays in Video Communications

In particular embodiments, the client system 130 may use augmented reality to overlay a game interface within a video communication between two or more users (e.g., a participant of the video communication). As an example and not by way of limitation, an augmented reality engine is used to track a participant's face and game elements may be implemented into a video chat to transform the video chat into an augmented reality game. Continuing the example, one game that may be implemented may be a basketball game by overlaying generated basketball game elements into the video chat. To do so, the augmented reality engine may use features identified within the video chat as game elements, such as, for example, a participant's face or other detectable features within the video chat. A gaming protocol may be used to start the game, maintain scoring within the game, determine who is the winner, and how to render and display the augmented reality elements into the video communication. More information on the gaming protocol may be found in U.S. patent application Ser. No. 15/869,926, filed on 12 Jan. 2018, which is incorporated by reference. Various applications of the coordinated activity protocol may be found in U.S. patent application Ser. No. 15/870,008, filed on 12 Jan. 2018 and U.S. patent application Ser. No. 15/870,040, filed on 12 Jan. 2018, which are incorporated by reference. Games may be selected, for example, from a "Games" tab or a list of games that may be opened within a video chat. The implementation of the game within the video communication provides another experience to improve participant interaction in real time. One example of a game implementation of the augmented reality overlay may be a basketball game where a participant's face is transformed into a basketball hoop by placing the basket onto the participant's nose. Continuing the example, the other participant in the call may attempt to shoot basketballs through the basket (e.g., with a flick of the finger on the screen). The first participant (with the hoop on their nose) may then attempt to help or thwart the second participant by moving their nose/hoop towards or away from the basketball. Scoring may be dependent on the number of shots made and the winner may be determined based on who made the most shots. Another example may be a space game, where a participant's nose may be overlaid with a laser shooting in an upward direction that the participant needs to aim at the targets (e.g., move his or her face in relation to the screen to aim). Scoring for this game may be dependent on how long the participant is able to continue within the game (e.g., how long the participant survives). Another example may be a drawing game where a participant's face is used as a control interface for the game in order to redraw a figure, object, etc. (e.g., an emoji). Each particular game may have logic injected in order to synchronize the start of the game, track scores, and how to end the game. For example, in a turn-based game, the game may choose to randomly select which participant starts first or have any other method of deciding which participant can be first (e.g., a minigame of rock, paper, scissors). Continuing the example, the game may have specific rules to score according to the game (e.g., making shots in basketball). Ways to end the game may include finishing a game session, which may include a "round" of the game or pressing a button to forfeit or end the game early. After ending the game, a game summary may be presented to all participants of the game and/or a "rematch" button may be presented to reinitiate the game. If the participants decide to not restart the game, then the augmented reality overlay may be removed, and the video communication may return to the normal video chat. Although this disclosure describes using augmented reality to overlay a game interface within a video communication in a particular manner, this disclosure contemplates using augmented reality to overlay a game interface within a video communication in any suitable manner.

After receiving an input to initiate a game within a first later of a communication interface and executing a gaming protocol associated with the game, in particular embodiments, the client system 130 may generate a first game container in a second layer of the communication interface. In particular embodiments, the client system 130 may generate the game container in the second layer to contain an augmented reality game overlay. As an example and not by way of limitation, the game may be initiated and be overlaid onto the first layer containing the video communication of the second user. In particular embodiments, the augmented reality game overlay may be semi-transparent with respect to the video communication of the second user in the first layer so as to allow the video communication of the second user to be visible. In particular embodiments, the augmented game overlay may be opaque with respect to the video communication of the second user in the first layer. In particular embodiments, the communication interface may include another layer containing a thumbnail view of a video communication of the user of the client system 130 (e.g., video of himself or herself). In particular embodiments, the client system 130 may generate a third layer of the communication interface to contain a second game container. The second game container may contain a mini-game to be played prior to the game in the first game container. As an example and not by way of limitation, the client system 130 may generate another layer for the users to play rock, paper, scissors and determine who goes first in a turn-based game depending on who wins the game of rock, paper, scissors. In particular embodiments, for a turn-based game, the client system 130 may randomly choose which user plays first in the first game. Although this disclosure describes generating a game container in a particular manner, this disclosure contemplates generating a game container in any suitable manner.

In particular embodiments, the client system 130 may display the second layer as an augmented reality overlay over the first layer containing the video communication of the second user. The second layer may contain game elements that correspond to one or more features in the video communication of the second user in the first layer. As an example and not by way of limitation, the client system 130 may use an augmented reality engine to identify features of the second user in the video communication, such as the user's nose, and overlay a game element over the user's nose, such as a basketball hoop. In particular embodiments, the client system 130 may map features in the video communication to game elements of the game. In particular embodiments, the client system 130 may receive inputs associated with an in-game action and determine a score based on the input associated with the in-game action. As an example and not by way of limitation, the client system 130 may receive a flick gesture that is associated with the game and based on the flick gesture, determine whether the user has scored (e.g., made a basket). In particular embodiments, the client system 130 may close the second layer from the communication interface when the first game is completed. In particular embodiments, the client system 130 may receive an in-game action of the first game which corresponds to movement of a feature of the second user. As an example and not by way of limitation, a basketball hoop may be overlaid onto the second user's nose and the second user may move his head around within the video communication, which would translate to moving the basketball hoop. In the example, the movement may prevent a user trying to shoot a basket at the second user's nose from successfully making a basket. In particular embodiments, if there is a third layer containing a thumbnail view of the user of the client system 130, the third layer may be closed when the client system 130 overlays the augmented reality overlay onto the first layer. Although this disclosure describes displaying the second layer as an augmented reality overlay over the first layer containing the video communication in a particular manner, this disclosure contemplates displaying the second layer as an augmented reality overlay over the first layer containing the video communication in any suitable manner.

Figure 9B:
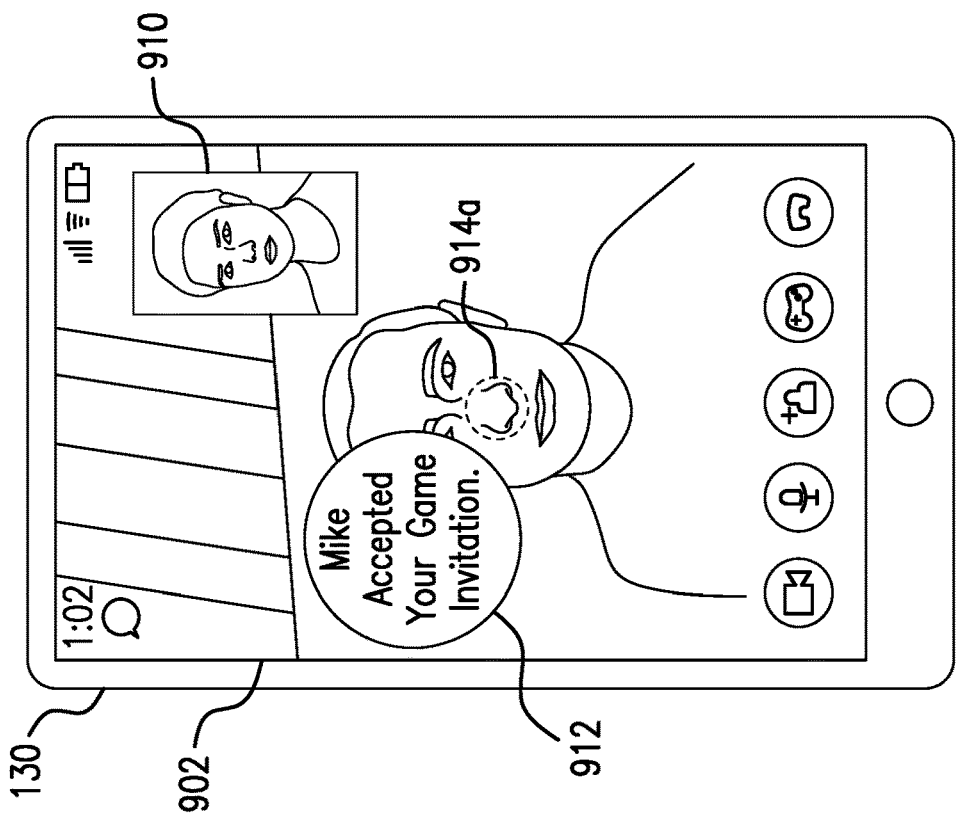
FIGS. 9A-9F are user interfaces showing an example of utilizing an augmented reality game overlay within a video chat.
Figure 9A:
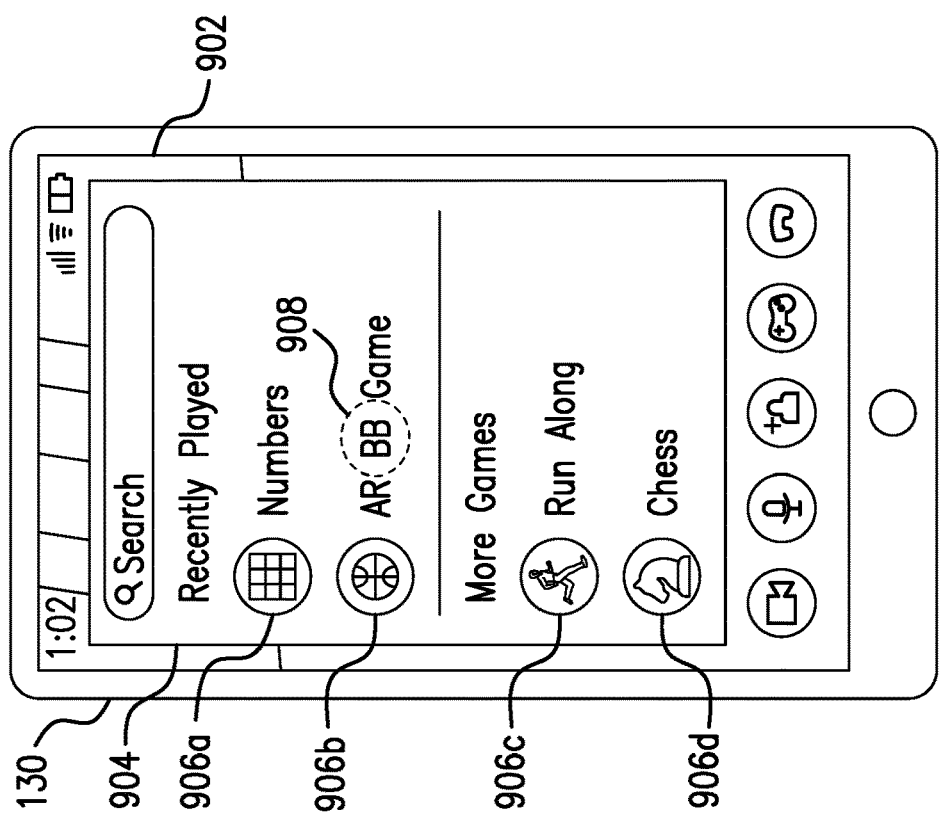

FIGS. 9A-9F illustrate an example of using augmented reality to overlay a game interface within a video communication between two or more users. Referring to FIG. 9A, a client system 130 may display a video communication of a second user in a layer 902 that is occluded by another layer 904 that contains a list of games 906a-906d. In order to get to what is displayed in FIG. 9A, the user may go through a similar process as outlined by FIGS. 7A-7B where the user selects an activatable element. As shown in FIG. 9A, the client system 130 may receive an input 908 from the user selecting game 906b. In particular embodiments, the list of games 906 may be separated into different categories (e.g., standard, augmented reality games, etc.) and subcategories.

FIG. 9B illustrates the result of the client system 130 receiving the input 908 selecting the augmented reality game 906b. In particular embodiments, the layer 904 is removed to reveal the layer 902 containing the video communication of the second user. The client system 130 may display a thumbnail view of a video communication of the user of the client system 130 in a layer 910. The client system 130 may wait to receive an acceptance 912 by the second user of the selected game 906b. The client system 130 may use an augmented reality engine to identify a plurality of features 914 of the video communication in the layer 902. In particular embodiments, the features 914 may correspond to features of the second user. As an example and not by way of limitation, the client system 130 may identify a feature 914a of the second user.

Figure 9D:
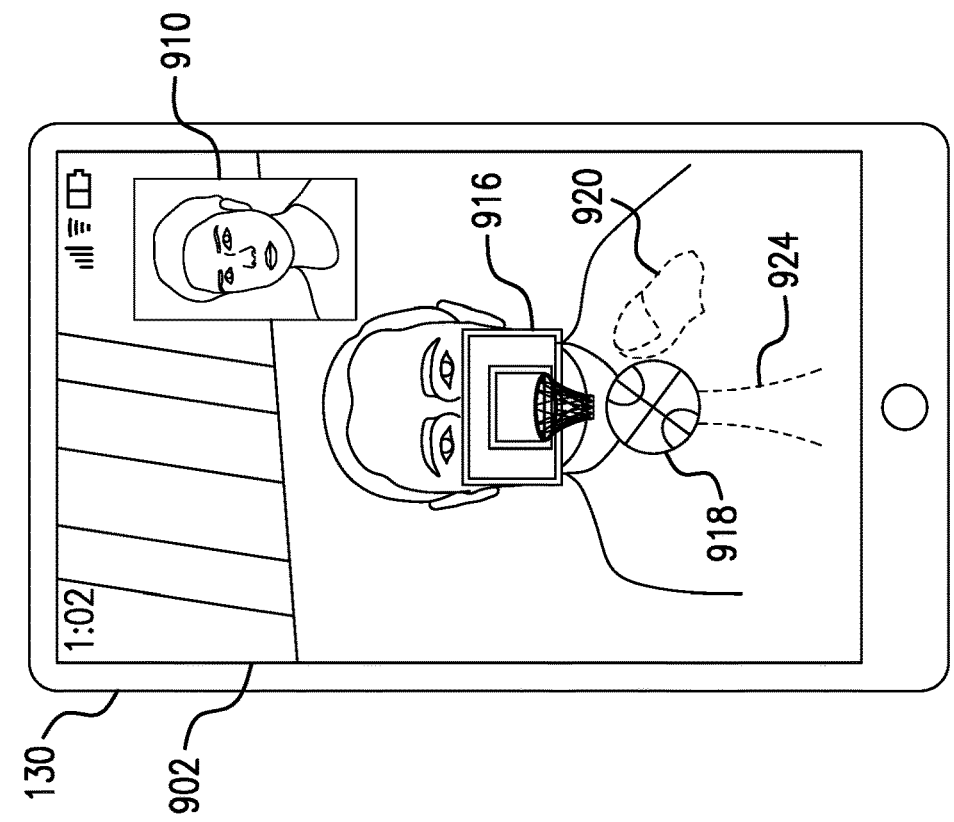
Figure 9C:
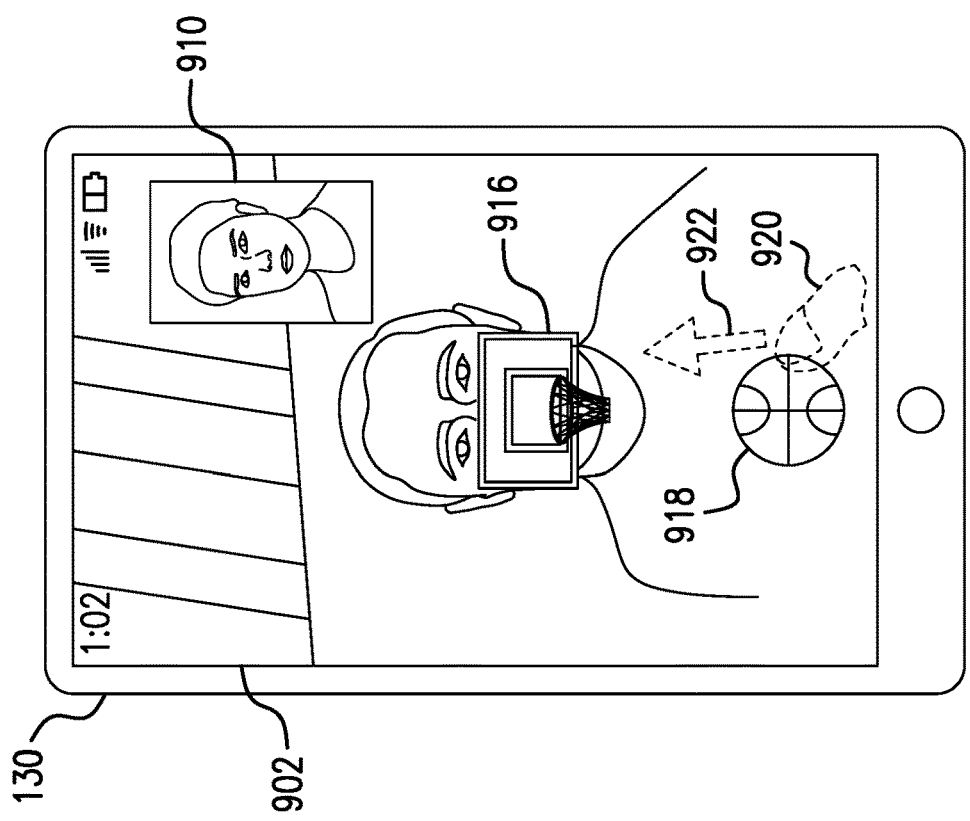

FIG. 9C illustrates the client system 130 generating another layer containing the game which includes the game elements 916, 918. The client system 130 may identify the feature 914a of the second user and overlay a game element 916 onto the feature 914a. The game element 918 may be positioned and overlaying the layer 902 in a default position. As an example and not by way of limitation, the game element 918 (e.g., a virtual basketball) may be generated on the center bottom of the communication interface. In particular embodiments, the game elements 916, 918 may be opaque. Alternatively, in particular embodiments, the game elements 916, 918 may be semi-transparent. In particular embodiments, the game element 916 may be fixed onto the feature 914a and may follow the feature 914a as the second user moves around within the video communication contained in the layer 902. As shown in FIG. 9C, the user may have a touch element 920 to interact with the game overlaid on the layer 902. The user may perform a gesture 922 corresponding to an in-game action with the touch element 920. As an example and not by way of limitation, the user may perform a flicking gesture with his or her index finger. In particular embodiments, the client system 130 may be using application programming interface (API) calls to relay data with the client system 130 of the second user.

FIG. 9D illustrates the result of performing the gesture 922 within the game interface overlaid layer 902. The touch element 920 may be in a second position. The game element 918 may move corresponding to the gesture 922 and project a path 924 to indicate that the game element's 918 trajectory. In particular embodiments, the user may aim towards the game element 916. The in-game action as a result of the gesture 922 is a movement of the game element 918. As an example and not by way of limitation, the gesture 922 results in an in-game action of shooting the basketball. Alternatively, the gesture 922 may correspond to an in-game action that may result in a different in-game action.

Figure 9F:
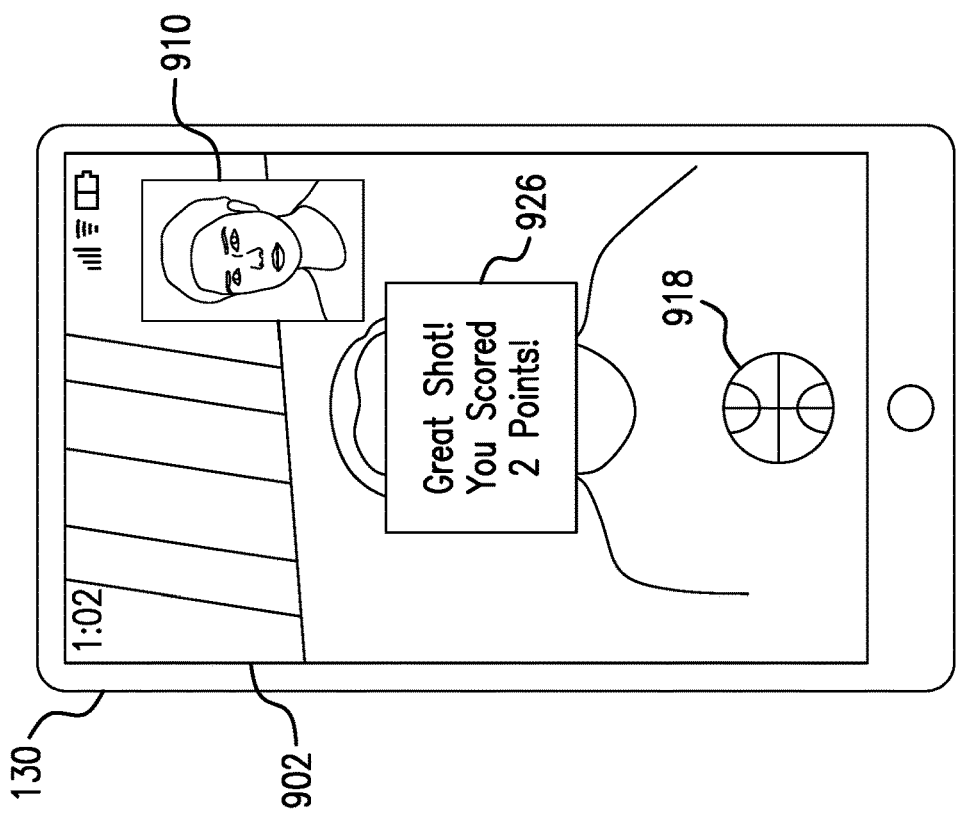
Figure 9E:
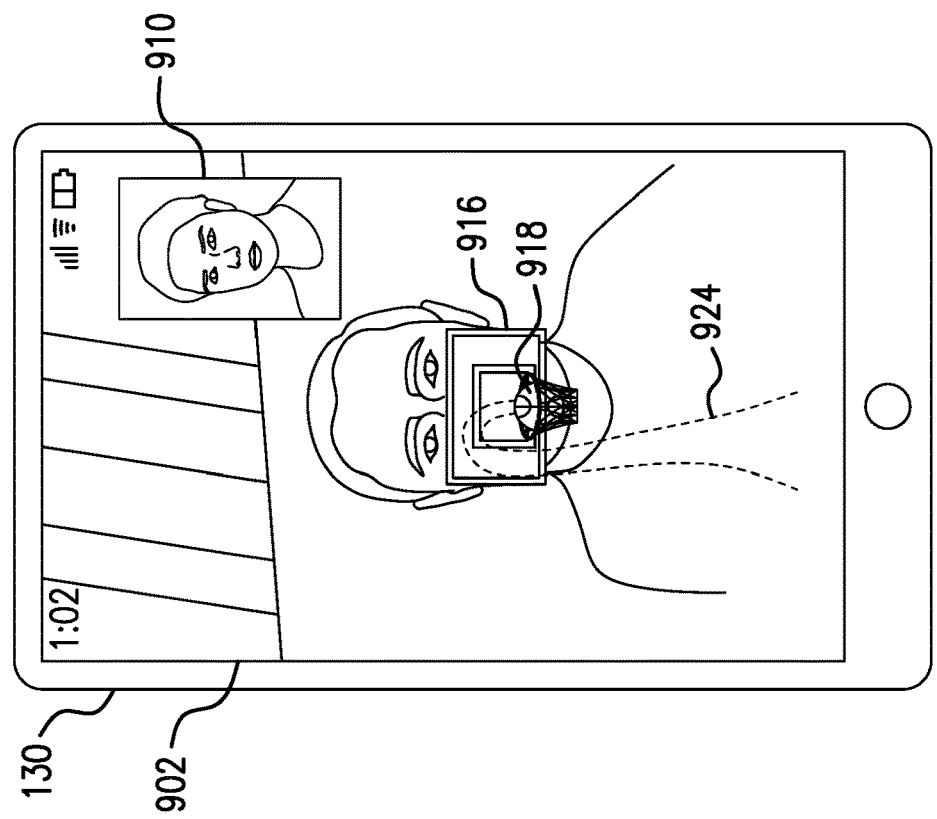

FIG. 9E illustrates the continuing in-game action that results from the gesture 922. The game element 918 continues to travel along path 924 toward game element 916. FIG. 9F illustrates the result of the in-game action corresponding to the gesture 922. The client system 130 generates an alert 926 corresponding to the points added to the user's score based on the shots made. In particular embodiments, the alert 926 may notify the result of the gesture 922. As an example and not by way of limitation, the alert 926 may notify the user of a missed shot. In particular embodiments, the user may adjust the settings to determine game parameters. As an example and not by way of limitation, the user may adjust how many shots the user may take before it is the second user's turn to attempt to score. The client system 130 may track the score based on the gaming protocol of the selected game 906b.

FIG. 10 illustrates an example method 1000 for using augmented reality to overlay a game interface within a video communication between two or more users. The method may begin at step 1010, where the client system 130 of a first user may receive an input to initiate a first game within a first layer of a communication interface that includes one or more layers containing a live video communication between the first user and a second user. The first layer may include a video communication of the second user and the first game is accessible via the communication interface. At step 1020, the client system 130 may execute a gaming protocol associated with the first game. The gaming protocol includes instructions for coordinating in-game actions between the first and second users via application programming interface (API) calls to a gaming server. At step 1030, the client system 130 may generate a game container in a second layer of the communication interface. The second layer may contain the first game in an augmented reality overlay. At step 1040, the client system 130 may display the second layer as an augmented reality overlay over the first layer containing the video communication of the second user. The first game in the second layer may contain one or more game elements that correspond to one or more features in the video communication of the second user in the first layer. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for using augmented reality to overlay a game interface within a video communication between two or more users including the particular steps of the method of FIG. 10, this disclosure contemplates any suitable method for using augmented reality to overlay a game interface within a video communication between two or more users including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Social Graph Affinity, Game Affinity, and Coefficients

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems, such as the messaging system 180 or the game managing system 190. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on a messaging system 180, on a game-managing system 190, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, an online messaging network associated with a messaging system 180, an online gaming network associated with a game-managing system 190, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 166, the social-networking system 160 may analyze the number and/or type of edges 406 connecting particular user nodes 402 and concept nodes 404 when calculating a coefficient. As an example and not by way of limitation, user nodes 402 that are connected by a spouse-type edge (representing that the two users are married) may be assigned a higher coefficient than a user nodes 402 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 166. As an example and not by way of limitation, social-graph entities that are closer in the social graph 166 (i.e., fewer degrees of separation) may have a higher coefficient than entities that are further apart in the social graph 166.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In connection with game affinity and analysis of the gamer graph, described above, particular embodiments may utilize one or more systems, components, elements, functions, methods, operations, or steps described in relation to social-graph affinity and affinity coefficients described above. In particular embodiments, the gaming platform 140 (independently or in cooperation with the social-networking system 160) may determine the game affinity of various game-graph entities for each other. Game affinity may represent the strength of a relationship or level of interest between particular objects associated with the online gaming environment, such as users, games, and other objects associated with the online gaming environment, or any suitable combination thereof. Game affinity may also be determined with respect to objects associated with social-networking systems 160, third-party systems 170, game-managing systems 190, or other suitable systems. An overall game affinity for a game-graph entity for each user, game, or type of object may be established. The overall game affinity may change based on continued monitoring of the actions or relationships associated with the game-graph entity. Although this disclosure describes determining particular game affinities in a particular manner, this disclosure contemplates determining any suitable game affinities in any suitable manner.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 404 corresponding to a particular photo may have a privacy setting specifying that the photo may only be accessed by users tagged in the photo and their friends. In particular embodiments, privacy settings may allow users to opt in or opt out of having their actions logged by the social-networking system 160, the messaging system 180, or shared with other systems (e.g., a third-party system 170, game-managing system 190, etc.). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, the social-networking system 160 or the messaging system 180 may include authorization/privacy servers for enforcing privacy settings. In response to a request from a user (or other entity) for a particular object stored in a data store 164 or data store 184, the social-networking system 160/the messaging system 180 may send a request to the data store 164/data store 184 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164/data store 184, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a client system of a first user:
    presenting, by the client system, a communication interface comprising a plurality of layers containing a live video communication between the first user and a second user, wherein a first layer of the communication interface comprises a video communication of the second user, wherein a second layer of the communication interface comprises a thumbnail view of a video communication of the first user, and wherein the communication interface comprises an activatable element to access a first game;
    receiving, by the client system, an input to initiate the first game within the first layer of a communication interface via a selection of the activatable element;
    executing, by the client system, a gaming protocol associated with the first game, wherein the gaming protocol comprises instructions for coordinating in-game actions between the first and second users via application programming interface (API) calls to a gaming server;
    generating, by the client system, a game container in a third layer of the communication interface, wherein the third layer contains the first game in a full-screen view of the communication interface;
    reducing, by the client system, the first layer containing the video communication of the second user to a thumbnail within the communication interface; and
    overlaying, by the client system, the first layer onto the third layer based on one or more parameters set by the gaming protocol, wherein the second layer is closed responsive to the overlaying of the first layer onto the third layer.

2. The method of claim 1, wherein receiving the input to initiate the first game comprises:

receiving, by the client system, an indication the first user has selected the activatable element to access a games tab;

presenting, by the client system, a fourth layer containing the games tab, wherein the games tab comprises a list of one or more games accessible via the communication interface; and receiving, by the client system, an indication the first user has selected the first game from the list.

3. The method of claim 1, wherein executing the gaming protocol comprises:

sending, by the client system, a request via the gaming server to the second user to execute the gaming protocol associated with the first game; and receiving, by the client system, a confirmation via the gaming server that the second user has executed the gaming protocol associated with the first game.

4. The method of claim 1, wherein the gaming protocol comprises settings for configuring the first game within the communication interface.

5. The method of claim 1, wherein the first user and the second user have corresponding user profiles comprising one or more of gaming-moment information or user preferences.

6. The method of claim 1, wherein executing the gaming protocol comprises matching the first user and the second user to play the first game.

7. The method of claim 6, wherein executing the gaming protocol further comprises comparing one or more user preferences in the user profiles of the first and second users.

8. The method of claim 1, further comprising:

receiving, by the client system, an input to adjust one or more of a position or size of the thumbnail video communication of the second user.

9. The method of claim 1, wherein the first game includes one or more game elements, and wherein the thumbnail within the first layer is overlaid to avoid overlaying onto the one or more game elements.

10. The method of claim 1, wherein the live video communication between the first user and the second user is initially in a full-screen view, and wherein the first layer is reduced from the full-screen view to the thumbnail within the communication interface.

11. One or more computer-readable non-transitory storage media embodying software that is operable when executed by a client system to:

present a communication interface comprising a plurality of layers containing a live video communication between the first user and a second user, wherein a first layer of the communication interface comprises a video communication of the second user, wherein a second layer of the communication interface comprises a thumbnail view of a video communication of the first user, and wherein the communication interface comprises an activatable element to access a first game;

receive an input to initiate the first game within the first layer of a communication interface via a selection of the activatable element;

execute a gaming protocol associated with the first game, wherein the gaming protocol comprises instructions for coordinating in-game actions between the first and second users via application programming interface (API) calls to a gaming server;

generate a game container in a third layer of the communication interface, wherein the third layer contains the first game in a full-screen view of the communication interface;

reduce the first layer containing the video communication of the second user to a thumbnail within the communication interface; and overlay the first layer onto the third layer based on one or more parameters set by the gaming protocol, wherein the second layer is closed responsive to the overlaying of the first layer onto the third layer.

12. A client system comprising: one or more processors; and a non-transitory memory coupled to the processors comprising instructions executable by the processors, the processors operable when executing the instructions to:

present a communication interface comprising a plurality of layers containing a live video communication between the first user and a second user, wherein a first layer of the communication interface comprises a video communication of the second user, wherein a second layer of the communication interface comprises a thumbnail view of a video communication of the first user, and wherein the communication interface comprises an activatable element to access a first game;

receive an input to initiate the first game within the first layer of a communication interface via a selection of the activatable element;

execute a gaming protocol associated with the first game, wherein the gaming protocol comprises instructions for coordinating in-game actions between the first and second users via application programming interface (API) calls to a gaming server;

generate a game container in a second layer of the communication interface, wherein the second layer contains the first game in a full-screen view of the communication interface;

reduce the first layer containing the video communication of the second user to a thumbnail within the communication interface; and overlay the first layer onto the second layer based on one or more parameters set by the gaming protocol.

* * * * *